US012674628B2

(12) United States Patent
Källstrand et al.

(10) Patent No.: US 12,674,628 B2
(45) Date of Patent: Jul. 7, 2026

(54) FLUID REACTOR DEVICE AND METHOD FOR OPERATING A FLUID REACTOR DEVICE

(71) Applicant: Dürr Systems AB, Gothenburg (SE)

(72) Inventors: Ake Källstrand, Gothenburg (SE); Reino Carlsson, Hyssna (SE)

(73) Assignee: Dürr Systems AB

( * ) Notice: Subject to any disclaimer, the term of this patent is extended or adjusted under 35 U.S.C. 154(b) by 131 days.

(21) Appl. No.: 18/838,485

(22) PCT Filed: Feb. 23, 2023

(86) PCT No.: PCT/EP2023/054493
§ 371 (c)(1),
(2) Date: Aug. 14, 2024

(87) PCT Pub. No.: WO2023/161313
PCT Pub. Date: Aug. 31, 2023

(65) Prior Publication Data
US 2025/0146765 A1 May 8, 2025

(30) Foreign Application Priority Data

Feb. 25, 2022 (EP) ..................................... 22159013

(51) Int. Cl.
*F28D 20/00* (2006.01)
*B01D 53/34* (2006.01)

(52) U.S. Cl.
CPC ......... *F28D 20/003* (2013.01); *B01D 53/343* (2013.01); *B01D 2259/655* (2013.01); *F28D 2020/0073* (2013.01)

(58) Field of Classification Search
CPC ........... F28D 20/003; F28D 2020/0073; F28D 20/0056; F28D 17/04; B01D 53/343;
(Continued)

(56) References Cited

U.S. PATENT DOCUMENTS 2,315,525 A 4/1943 Hulsberg
2,338,346 A * 1/1944 Mather .................. B01J 8/0415
55/484
(Continued)

FOREIGN PATENT DOCUMENTS

CN 101915117 A 12/2010
CN 202012917 U 10/2011
(Continued)

*Primary Examiner* — Jon T. Schermerhorn, Jr.
(74) *Attorney, Agent, or Firm* — 2 SPL Patent Attorneys PartG mbB; Kieran O'Leary

(57) ABSTRACT

A fluid reactor device, in particular a fluid purification device, is provided. The fluid reactor device includes a heat-transfer bed including heat storage material. The heat storage material is configured to heat fluid flowing through the heat storage material such that the fluid heats up and reacts while flowing through the heat storage material. Further, the fluid reactor device includes a first plenum fluidly coupled to a first opening of the heat-transfer bed, and a second plenum fluidly coupled to a second opening of the heat-transfer bed. Additionally, the fluid reactor device includes a heat blocking element arranged in the first plenum. The heat blocking element is spaced apart from the heat-transfer bed and is spaced apart from a housing of the first plenum. The heat blocking element extends beyond the first opening and is configured to limit heat emission from the heat storage material into the first plenum.

21 Claims, 14 Drawing Sheets

(58) Field of Classification Search
CPC .. B01D 2259/655; B01J 8/0415; F01N 13/00;
F01N 3/24; F01N 2260/08; F23G 7/068;
F28F 27/006; F28F 2270/00; F23J
2215/00
USPC ....................................................... 165/104.12
See application file for complete search history.

(56)                        References Cited

U.S. PATENT DOCUMENTS

| | | | |
|---|---|---|---|
| 2,512,562 A | | 6/1950 | Leland |
| 3,996,025 A | * | 12/1976 | Gulden .................... B01J 8/048 |
| | | | 48/107 |
| 4,277,443 A | * | 7/1981 | Van der Smissen ... A62B 21/00 |
| | | | 55/DIG. 35 |
| 4,901,675 A | * | 2/1990 | Brown ................... B01J 8/1809 |
| | | | 431/170 |

| | | | |
|---|---|---|---|
| 9,134,075 B2 | * | 9/2015 | Stiesdal .............. F28D 20/0056 |
| 9,669,358 B2 | * | 6/2017 | Bose ...................... B01J 8/0278 |
| 10,161,689 B2 | * | 12/2018 | Kloeppner ................ F28F 1/00 |
| 2013/0001166 A1 | * | 1/2013 | Augier .............. B01D 15/1842 |
| | | | 210/661 |
| 2017/0307302 A1 | | 10/2017 | Jacobs et al. |
| 2020/0318642 A1 | * | 10/2020 | Lissner .................... F04F 5/46 |
| 2024/0207773 A1 | * | 6/2024 | Källstrand ............... F01N 3/00 |
| 2024/0207774 A1 | * | 6/2024 | Källstrand ............... F01N 3/28 |
| 2024/0209764 A1 | * | 6/2024 | Källstrand ............... F01N 3/28 |
| 2024/0369311 A1 | * | 11/2024 | Mouchet .............. F28D 20/028 |

FOREIGN PATENT DOCUMENTS

| | | | | | |
|---|---|---|---|---|---|
| CN | 207307604 U | | 5/2018 | | |
| CN | 113748305 A | * | 12/2021 | ............... | F28D 7/16 |
| DE | 102015205547 A1 | | 9/2016 | | |
| EP | 3247967 A | | 11/2017 | | |
| EP | 3705832 A1 | | 9/2020 | | |

* cited by examiner

FLUID REACTOR DEVICE AND METHOD FOR OPERATING A FLUID REACTOR DEVICE

CROSS-REFERENCE TO RELATED APPLICATIONS

This application is a 35 U.S.C. § 371 (c) national stage entry of PCT/EP2023/054493, filed on Feb. 23, 2023. That application claimed priority to European Application 22159013.6 filed on Feb. 25, 2022. The contents of these earlier filed applications are incorporated by reference herein in their entirety.

FIELD

The present disclosure relates to reaction processing of fluids. In particular, examples of the present disclosure relate to a (regenerative) fluid reactor device, in particular to a fluid purification device, and a method for operating a (regenerative) fluid device.

BACKGROUND

Conventional systems using a heat-transfer bed filled with ceramic material for exhaust gas purification suffer from various heat loses such as heat losses at the side walls of the heat-transfer bed or at the inlets and outlets of the heat-transfer bed for the exhaust gas. Additionally, such conventional systems suffer from a spatially varying pressure drop at the inlets of the heat-transfer bed for the exhaust gas. As a consequence, the flow distribution of the exhaust gas over the heat-transfer bed is uneven and causes an uneven temperature distribution in the heat-transfer bed, which may result in insufficient heating of the exhaust gas when passing the heat-transfer bed and, hence, negatively affect the purification of the exhaust gas.

There may be demand for improved reaction processing, in particular purification, of fluids such as exhaust gases.

SUMMARY

The demand may be satisfied by the subject-matter of the appended claims.

According to a first aspect, the present disclosure provides a (regenerative) fluid reactor device, in particular a (regenerative) fluid purification device. The fluid reactor device comprises a heat-transfer bed comprising heat storage material. The heat storage material is configured to heat fluid flowing through the heat storage material such that the fluid heats up and reacts while flowing through the heat storage material. Further, the fluid reactor device comprises a first plenum fluidly coupled to a first opening of the heat-transfer bed, and a second plenum fluidly coupled to a second opening of the heat-transfer bed. Additionally, the fluid reactor device comprises a heat blocking element arranged in the first plenum. The heat blocking element is spaced apart from the heat-transfer bed and is spaced apart from a housing of the first plenum. The heat blocking element extends beyond the first opening and is configured to limit heat emission from the heat storage material into the first plenum.

The heat blocking element in the first plenum may allow to reduce heat loses at the first opening of the heat-transfer bed. Furthermore, the heat blocking element in the first plenum may allow for an improved flow distribution of the fluid over the heat-transfer bed such that a more even temperature distribution in the heat-transfer bed may be achieved. As a consequence, the reaction processing (e.g., purification) of the fluid may be improved compared to conventional approaches.

According to some examples of the present disclosure, the fluid reactor device further comprises another heat blocking element arranged in the second plenum. The other heat blocking element is spaced apart from the heat-transfer bed and is spaced apart from a housing of the second plenum. The other heat blocking element extends beyond the second opening and is configured to limit heat emission from the heat storage material into the second plenum. The other heat blocking element in the second plenum may allow to reduce heat loses at the second opening of the heat-transfer bed. Furthermore, the other heat blocking element in the second plenum may allow to further improve the flow distribution of the fluid over the heat-transfer bed such that a more even temperature distribution in the heat-transfer bed may be achieved. As a consequence, the reaction processing (e.g., purification) of the fluid may be further improved compared to conventional approaches.

In some examples of the present disclosure, a gap formed between a boundary of the first opening and a surface of the heat blocking element facing the first opening acts as a nozzle for the fluid when flowing from the first plenum to the heat-transfer bed. This exemplary configuration may allow to support the generation of the improved flow distribution of the fluid in the heat-transfer bed.

According to some examples of the present disclosure, the surface of the heat blocking element extends substantially parallel to the first opening. This exemplary configuration may allow to define the width of the gap and, hence, to adjust the nozzle effect of the gap.

In some examples of the present disclosure, the heat-transfer bed comprises one or more protrusion formed at the boundary of the first opening for defining the gap between the surface of the heat blocking element and the boundary of the first opening. The one or more protrusion may allow to define the width of the gap and, hence, to adjust the nozzle effect of the gap.

According to some examples of the present disclosure, the heat blocking element comprises at least one movable element for adjusting the gap between the boundary of the first opening and at least part of the surface of the heat blocking element. In these examples, the fluid reactor device further comprises at least one actuator configured to adjust, based on a temperature and/or a pressure and/or a differential pressure in the first plenum and/or time based and/or event based, a respective positioning and/or orientation of the at least one movable element relative to the boundary of the first opening. Changing the positioning and/or orientation of the at least one movable element relative to the boundary of the first opening may allow to adjust (control) the variation of the static pressure at the first opening in order to support the generation of the improved flow distribution of the fluid in the heat-transfer bed.

In alternative examples of the present disclosure, the heat blocking element is bendable for adjusting the gap between the boundary of the first opening and at least part of the surface of the heat blocking element. In these examples, the fluid reactor device further comprises at least one actuator configured to exert, based on a temperature and/or a pressure and/or a differential pressure in the first plenum and/or time based and/or event based, a force on the heat blocking element for bending the heat blocking element. Adjusting the gap by bending the heat blocking element may allow to adjust (control) the variation of the static pressure at the first opening in order to support the generation of the improved flow distribution of the fluid in the heat-transfer bed.

In further alternative examples of the present disclosure, the heat blocking element comprises a bimetal structure configured to bend the heat blocking element based on a temperature in the first plenum for adjusting the gap between the boundary of the first opening and at least part of the surface of the heat blocking element. Adjusting the gap by means of the bimetal structure may allow to adjust (control) the variation of the static pressure at the first opening in order to support the generation of the improved flow distribution of the fluid in the heat-transfer bed.

According to some examples of the present disclosure, a surface of the heat blocking element facing the first opening is tilted with respect to the first opening. In these examples, the first plenum extends lengthwise along a first spatial direction such that the fluid travels through the first plenum along the first spatial direction during a time period in which the first plenum is configured to supply the fluid to the heat-transfer bed. A distance between the surface of the heat blocking element and the first opening increases along the first spatial direction. A distance between another opposite surface of the heat blocking element and a wall of the first plenum's housing decreases along the first spatial direction. The first opening and the wall of the first plenum's housing are arranged on opposite sides of the heat blocking element. Also this exemplary configuration may allow to support the generation of the improved flow distribution of the fluid in the heat-transfer bed.

In some examples of the present disclosure, the heat blocking element is substantially plate-shaped. The plate-shaped may allow simple implementation of the heat blocking element.

According to some examples of the present disclosure, the heat blocking element comprises another opposite surface facing a wall of the first plenum's housing. In these examples, the first opening and the wall of the first plenum's housing are arranged on opposite sides of the heat blocking element. The first plenum extends lengthwise along a first spatial direction such that the fluid travels through the first plenum along the first spatial direction during a time period in which the first plenum is configured to supply the fluid to the heat-transfer bed. A distance between the surface and the other surface of the heat blocking element increases along the first spatial direction. A distance between the other surface of the heat blocking element and the wall of the first plenum's housing decreases along the first spatial direction. Also this exemplary configuration may allow to support the generation of the improved flow distribution of the fluid in the heat-transfer bed.

In some examples of the present disclosure, the fluid reactor device further comprises at least one actuator coupled to the heat blocking element. In these examples, the at least one actuator is configured to adjust, based on a temperature and/or a pressure and/or a differential pressure in the first plenum and/or time based and/or event based, a positioning and/or orientation of the heat blocking element's surface with respect to the first opening. Changing the positioning and/or orientation of the heat blocking element's surface may allow to adjust (control) the variation of the static pressure at the first opening in order to support the generation of the improved flow distribution of the fluid in the heat-transfer bed.

According to some examples of the present disclosure, a plurality of recesses for passthrough of the fluid are formed in the heat blocking element. The plurality of recesses extend from a surface of the heat blocking element facing the first opening to another opposite surface of the heat blocking element. The plurality of recesses may allow to support the generation of the improved flow distribution of the fluid in the heat-transfer bed.

In some examples of the present disclosure, the first plenum extends lengthwise along a first spatial direction such that the fluid travels through the first plenum along the first spatial direction during a time period in which the first plenum is configured to supply the fluid to the heat-transfer bed. In these examples, a respective size of the plurality of recesses for passthrough of the fluid and/or a number of recesses for passthrough per unit area increases along the first spatial direction. This exemplary configuration may allow to lower the effective resistance of the heat blocking element for the fluid when entering the heat-transfer bed and, hence, support the generation of the improved flow distribution of the fluid in the heat-transfer bed.

According to some examples of the present disclosure, the heat blocking element comprises one or more surface structure for controlling a flow direction and/or flow characteristics of the fluid locally. The one or more surface structure may allow to support the generation of the improved flow distribution of the fluid in the heat-transfer bed.

In some examples of the present disclosure, the other heat blocking element arranged in the second plenum may comprise one or more of the other features, or a selection of features as disclosed for the heat blocking element arranged in the first plenum as described in the sections above. In some preferred embodiments, the heat blocking element and the other heat blocking element are very much similar, analogous, identical and/or symmetric in their construction and features, especially the features disclosed for the heat blocking element in the sections above, to allow for an oscillating operation of the fluid reactor device, by which one of the first and second plenum serves as entry whereas the other serves as exit for a fluid to be processed in the heat-transfer bed of the fluid reactor device in alternating states/phases of operation.

For example, the first plenum and the second plenum may be configured to alternatingly supply the fluid to the heat-transfer bed such that the fluid heats up and reacts while flowing through the heat storage material. Further, during a time period in which one of the first plenum and the second plenum is configured to supply the fluid to the heat-transfer bed, the other one of the first plenum and the second plenum may be configured to drain the reacted fluid from the heat-transfer bed. The periodic reversion of the flow direction of the fluid through the heat storage material may allow to maintain a high heat exchange efficiency of the heat storage material (e.g., higher than 95%). Accordingly, the fluid reactor device may recover substantially all the heat needed for sustaining a needed reaction temperature in the heat-transfer bed (e.g., an oxidation temperature or a reduction temperature). Accordingly, the fluid reactor device may be understood as a regenerative fluid reactor device.

In some examples of the present disclosure, the fluid reactor device further comprises an electrical heater configured to heat the heat storage material to a predefined temperature. The electrical heater may allow to initially heat the ceramic material to the predefined temperature.

According to some examples of the present disclosure, catalyst material for lowering a reaction temperature of the fluid is arranged within the heat-transfer bed. Due to the catalyst material, the needed temperature for the reaction of the fluid may be lowered such that the fluid reactor device may operate at lower temperatures.

In some examples of the present disclosure, the heat-transfer bed comprises a thermally insulating wall surrounding the heat storage material and extending between the first plenum and the second plenum. In these examples, the first opening and the second opening are formed in the thermally insulating wall. The thermally insulating wall may allow to minimize heat losses over the heat-transfer bed.

According to some examples of the present disclosure, the housing of the first plenum is at least partly formed of and/or is at least partly covered by a heat-insulating material. The heat-insulating material may allow to minimize heat loses over the housing of the first plenum.

According to a second aspect, the present disclosure provides a method for operating a fluid reactor device according to the present disclosure. The method comprises supplying fluid to the heat-transfer bed such that the fluid heats up and reacts while flowing through the heat storage material.

The method may allow for fluid reaction processing with increased efficiency as heat loses at at least the first opening of the heat-transfer bed may be reduced. Furthermore, an improved flow distribution of the fluid over the heat-transfer bed may be enabled such that a more even temperature distribution in the heat-transfer bed may be achieved. As a consequence, the reaction processing (e.g., purification) of the fluid may be improved compared to conventional approaches.

In some examples of the present disclosure, supplying the fluid to the heat-transfer bed comprises supplying the fluid to the heat-transfer bed alternatingly through the first plenum and the second plenum such that the fluid heats up and reacts while flowing through the heat storage material. In these examples, the method further comprises, during a time period in which one of the first plenum and the second plenum supplies the fluid to the heat-transfer bed, draining the reacted fluid from the heat-transfer bed through the other one of the first plenum and the second plenum.

The periodic reversion of the flow direction of the fluid through the heat storage material may allow to maintain a high heat exchange efficiency of the heat storage material. Accordingly, the fluid reactor device may recover substantially all the heat needed for sustaining a needed reaction temperature in the heat-transfer bed. In other words, regenerative fluid reaction processing may be achieved.

BRIEF DESCRIPTION OF THE FIGURES

Some examples of apparatuses and/or methods will be described in the following by way of example only, and with reference to the accompanying figures, in which

FIG. 10 illustrates a sectional view of a seventh example of a fluid reactor device;

DETAILED DESCRIPTION

Figure 1A:
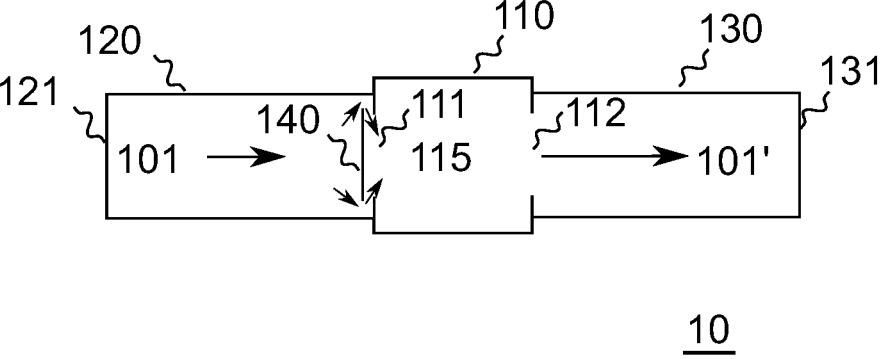
FIG. 1a illustrates a sectional view of a first example of a fluid reactor device.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1a schematically illustrates a fluid reactor device 10 for causing a fluid 101 to react. The fluid reactor device 10 causes at least part of the fluid 101 to react such that a reacted fluid 101' (i.e., the fluid after undergoing the reaction) is obtained.

The fluid 101 may be or comprise one or more gaseous components or substances, one or more vapor components or substances, one or more liquid components or substances, and/or mixtures thereof. According to examples of the present disclosure, the fluid 101 may comprise exclusively gaseous components or substances. For example, the fluid 101 may be an exhaust gas or an exhaust air, wherein an exhaust air contains a higher proportion of oxygen compared to an exhaust gas.

The type of reaction is not limited. In particular, the fluid reactor device 10 may be a fluid purification device for purifying the fluid 101. In case the fluid reactor device 10 is a fluid purification device, the fluid purification device removes one or more ingredient or reactant from the fluid 101 by reaction processing for purifying the fluid. The one or more ingredient or reactant may be understood as one or more impurity and/or one or more pollutant. An impurity may be understood in this context as a substance (ingredient, reactant) in the fluid 101 that is not included in a desired (target) composition of the fluid 101. A pollutant may be understood in this context as a substance (ingredient, reactant) that harms systems, animals, humans and/or the environment when occurring in a specific quantity or concentration (e.g., defined as mass of the pollutant per unit volume of the fluid 101 or as number of pollutant particles per unit volume of the fluid 101). One or more impurity or pollutant contained in the fluid 101 may be combustible. In other words, the fluid 101 may comprises one or more combustible ingredient or reactant. For example, organic and/or inorganic impurities or pollutants may be removed from the fluid 101 by the fluid purification device. The organic and/or inorganic impurities or pollutants may, e.g., be VOCs, solvents, nitrogen oxides ($NO_x$), methane ($CH_4$), sulfur oxides ($SO_x$), hydrogen fluoride (HF), ammonia ($NH_3$), hydrogen chloride (HCl), dioxins, furans or pollutants of the basic structure $C_xH_yO_z$ (C denotes carbon; H denotes hydrogen; O denotes oxygen; x, y, and z are natural numbers).

The fluid reactor device 10 comprises a (e.g., single, i.e., exactly/only one) heat-transfer bed 110. The heat-transfer bed 110 comprises (e.g., is filled with) heat storage material (heat transfer material) 115. The heat storage material 115 is configured to heat the fluid 101 such that the fluid 101 heats up and reacts while flowing through the heat storage material 115. The heat storage material 115 is material capable of storing and releasing heat. The heat storage material exhibits a certain (predefined) specific heat capacity and preferably a certain (predefined) heat transfer and/or transmission coefficient. For example, the heat storage material 115 may comprise or be ceramic material such as alumina porcelain, mullite, fireclay (chamotte), cordierite, zircon or a mixture thereof. However, the present disclosure is not limited thereto. Other types of ceramic material may be used as well. In some examples, the heat storage material 115 may alternatively or additionally comprise or be concrete, stone, rock, metallic material or a mixture thereof. The heat storage material 115 may be packed structured or randomly in the heat-transfer bed 110 to form regular or irregular patterns (e.g., ceramic honeycombs, ceramic saddles or the like may be used). In other words, the heat storage material 115 may comprise (e.g., exclusively) block shaped heat storage material, (e.g., exclusively) bulk heat storage material or combinations thereof.

Additionally, the heat-transfer bed 110 comprises a first opening 111 and a second opening 112 such that the heat storage material 115 is arranged between the first opening 111 and the second opening 112. A first plenum 120 is fluidly coupled to the first opening 111 of the heat-transfer bed (110). A second plenum 130 is fluidly coupled to the second opening 112 of the heat-transfer bed 110. The openings 111 and 112 are configured to allow the fluid 101 to enter the heat-transfer bed 110, and are further configured to allow the reacted fluid 101' to exit (leave) the heat-transfer bed 110. In the example of FIG. 1a, the first plenum 120 supplies the fluid 101 to the first opening 111 of the heat-transfer bed 110 such that the fluid 101 enters the heat-transfer bed 110 via the first opening 111. Accordingly, the reacted fluid 101' leaves the heat-transfer bed 110 via the second opening 112 and is drained by the second plenum 130.

The flow direction of the fluid 101 through the heat storage material 115 may be constant (stable) over time as indicated in FIG. 1a. In other examples, the flow direction of the fluid 101 through the heat storage material 115 may at least once be reversed over time (e.g., periodically or aperiodically). In this case, the first plenum 120 and the second plenum 130 are configured to alternatingly supply fluid 101 to the heat-transfer bed 110 such that the fluid 101 heats up and reacts while flowing through the heat storage material 115. During a time period in which one of the first plenum 120 and the second plenum 130 is configured to supply the fluid 101 to the heat-transfer bed 110, the other one of the first plenum 120 and the second plenum 130 is configured to drain the reacted fluid from the heat-transfer bed 110.

Additionally, the fluid reactor device 10 comprises a heat blocking element (structure, material, device, means) 140 arranged in (inside) the first plenum 120. The heat blocking element 140 is spaced apart from the heat-transfer bed 110 and is spaced apart from the housing 121 of the first plenum 120. The heat blocking element 140 extends beyond the first opening 111. The heat blocking element 140 is configured to limit heat emission from the heat storage material 115 into the first plenum 120. A gap is formed between a boundary of the first opening 111 and a surface of the heat blocking element 140 such that the fluid 101 can enter the first opening 111. For example, the heat blocking element 140 may at least in part be formed of a material storing and/or reflecting at least part of the heat released from the heat-transfer bed 110 via the first opening 111. The heat blocking element 140 may be formed of any material able to withstand temperatures of up to 200° C., 250° C. or 300° C. and/or pressures up to two bar. Optionally, the heat blocking element 140 may be formed of material able to withstand acidic and/or corrosive media. For example, the heat blocking element 140 may at least in part be formed of plastics, carbon, glass fiber, metal (e.g. spring steel) or mixtures, composite and/or laminates thereof.

Due to the presence of the heat blocking element 140, heat released from the heat-transfer bed 110 via the first opening 111 is at least in part reflected back to the heat-transfer bed 110 and/or at least stored near the first opening 111 such that it may be used for heating the fluid 101 entering the heat-transfer bed 110. Further, the presence of the heat blocking element 140 positively affects the flow distribution of the fluid 101.

Optionally, the fluid reactor device 10 may further comprise another heat blocking element (not illustrated) arranged in (inside) the second plenum 130. Like the heat blocking element 140, the other heat blocking element may be spaced apart from the heat-transfer bed and is spaced apart from a housing 131 of the second plenum 130. The other heat blocking element may extend beyond the second opening 112 and be configured to limit heat emission from the heat storage material 115 into the second plenum 130. Like the heat blocking element 140, the other heat blocking element may at least in part be formed of a material storing and/or reflecting at least part of the heat released from the heat-transfer bed 110 via the second opening 112. A gap may be formed between a boundary of the second opening 112 and a surface of the other heat blocking element.

Due to the presence of the other heat blocking element, heat released from the heat-transfer bed 110 via the second opening 112 may at least in part reflected back to the heat-transfer bed 110 and/or at least stored near the second opening 112 such that it may be used for heating the fluid 101 entering the heat-transfer bed 110. Further, the presence of the heat blocking element 140 may positively affect the flow distribution of the fluid 101. In particular, if the flow direction of the fluid 101 through the heat-transfer bed 110 is reversed over time, the other heat blocking element may allow for symmetric operation of the fluid reactor device 10.

A plurality of recesses for passthrough of the fluid 101 may optionally be formed in the heat blocking element 140. The plurality of recesses extend from the surface of the heat blocking element, which faces the first opening 111, to another opposite surface of the heat blocking element 140, which faces the housing 121 of the first plenum 120. The plurality of recesses in the heat blocking element 140 may support the generation of a beneficial flow distribution of the fluid 101 in the heat-transfer bed 110.

The heat blocking element 140 may optionally comprise one or more surface structure for controlling a flow direction and/or flow characteristics of the fluid 101 locally. In other words, one or more surface of the heat blocking element 140 may be structured for controlling the flow direction and/or the flow characteristics of the fluid 101 locally in order to support the generation of a beneficial flow distribution of the fluid 101 in the heat-transfer bed 110. For example, one or more guide baffle and/or one or more orifice may be used as surface structures.

In the following, a plurality of more detailed fluid reactor devices will be described with reference to the figures to highlight further aspects of the present disclosure.

Figure 1B:
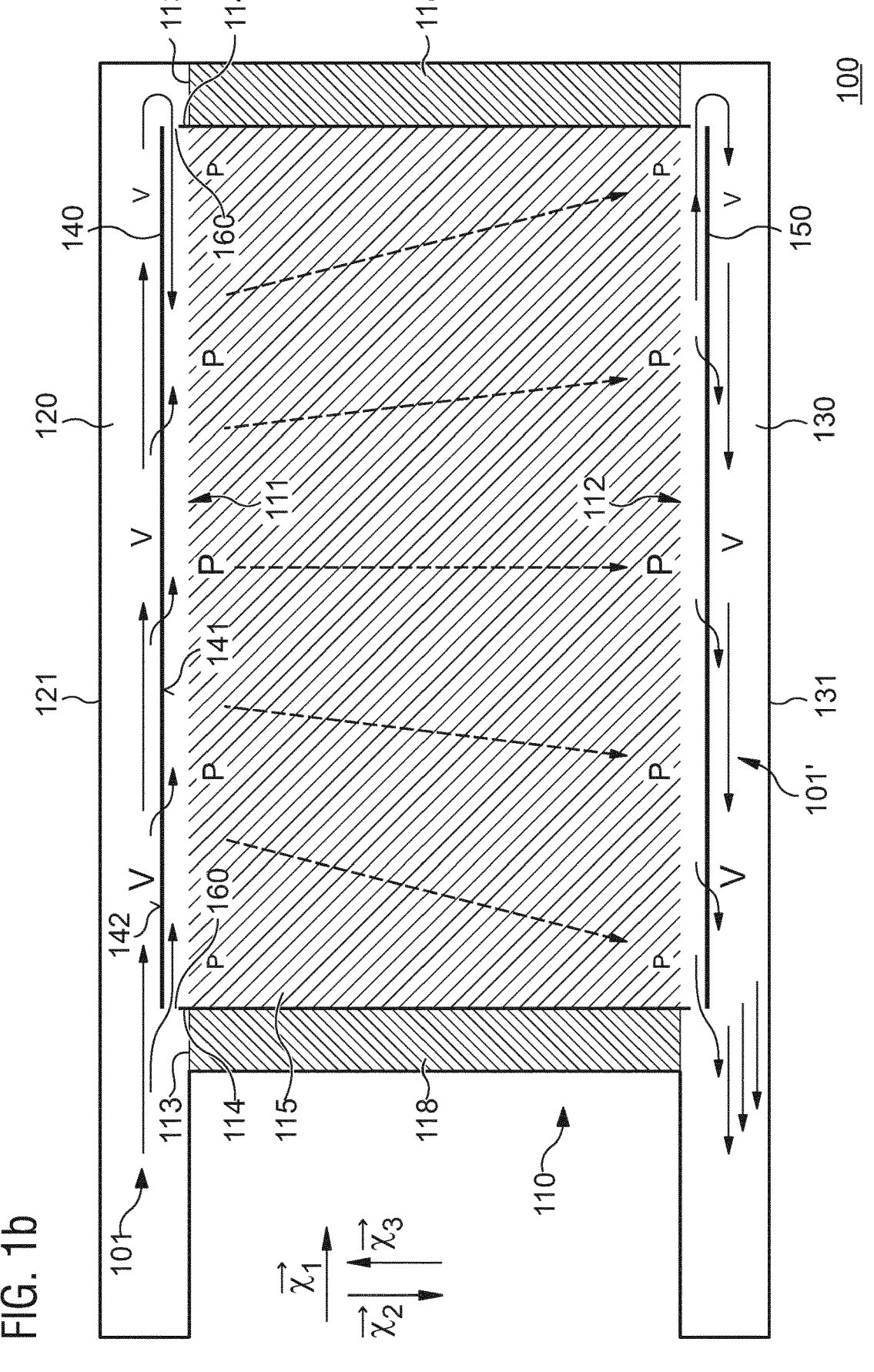
FIG. 1b and FIG. 2 illustrate a sectional view of a second example of a fluid reactor device.
Figure 2:
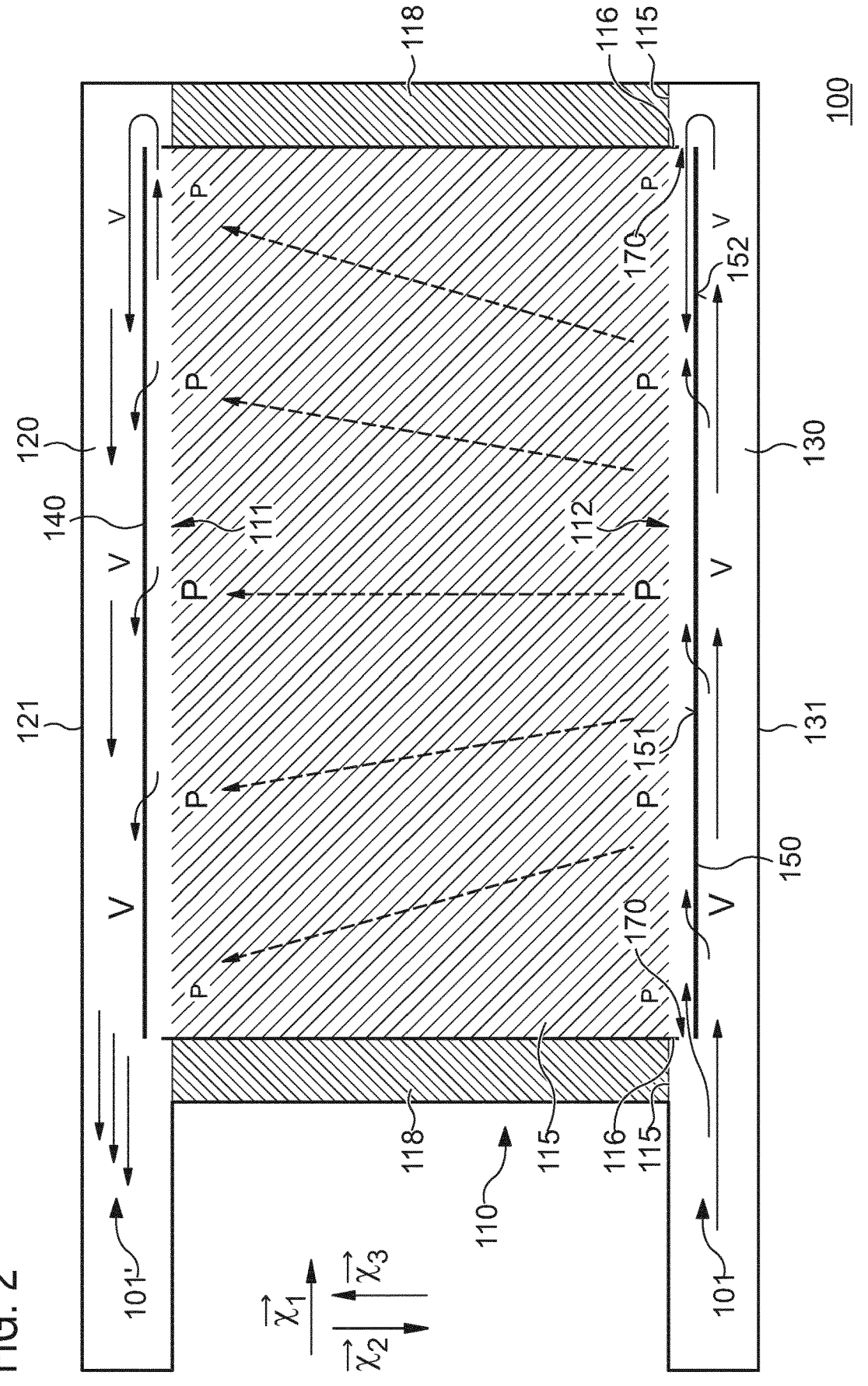

FIG. 1*b* and FIG. 2 schematically illustrate a sectional view of another fluid reactor device 100 for reaction processing (e.g., purification) of a fluid 101.

The fluid reactor device 100 comprises a (e.g. single, i.e., exactly/only one) heat-transfer bed 110. The heat transfer bed 110 comprises (e.g., is filled with) heat storage material (heat transfer material) 115 as described above.

The heat-transfer bed 110 comprises a thermally insulating wall 118 surrounding the heat storage material 115. A first opening 111 and a second opening 112 are formed in the thermally insulating wall 118. A first plenum 120 is attached to the first opening 111 of the heat-transfer bed 110, and a second plenum 130 is attached to the second opening 112 of the heat-transfer bed 110. The first opening 111 and the second opening 112 are arranged on opposite sides of the heat-transfer bed 110 such that the thermally insulating wall 118 extends between the first plenum 120 and the second plenum 130. In other examples, at least one of the first plenum 120 and the second plenum 130 need not be directly attached to the first and second openings 111 and 112. For example, one or more intermediate elements or a (temporary) bypass may be coupled between at least one of the first plenum 120 and the second plenum 130 and the first and second openings 111 and 112. In general, the first plenum 120 is fluidly coupled to the first opening 111, and the second plenum 130 is fluidly coupled to the second opening 112.

The first plenum 120 and the second plenum 130 are configured to alternatingly supply the fluid 101 to the heat-transfer bed 110 such that the fluid 101 heats up and reacts while flowing through the heat storage material 110. It is to be noted that all components of the fluid 101 or only part of the components of the fluid 101 may react. In other words, at least one component of the fluid 101 reacts while flowing through the heat storage material 115. That is, the fluid 101 may comprise one or more reactive component which reacts while flowing through the heat storage material 115 and one or more non-reactive component which does not react while flowing through the heat storage material 115. For example, the fluid 101 may be heated up and be subject to an oxidation process or a reduction process while flowing through the heat storage material 115. The heat storage material 115 is configured to store heat released by the fluid 101 during and/or after the reaction. During a time period in which one of the first plenum 120 and the second plenum 130 is configured to supply the fluid 101 to the heat-transfer bed 110, the other one of the first plenum 120 and the second plenum 130 is configured to drain the reacted fluid 101' (i.e. the fluid after undergoing the reaction) from the heat-transfer bed 110. Accordingly, a flow direction of the fluid 101 through the heat storage material 115 is periodically reversed (e.g. every 90 to 120 seconds).

FIG. 1*b* illustrates the fluid reactor device 100 during a time period in which the first plenum 120 is configured to supply the fluid 101 to the heat-transfer bed 110 and the second plenum 130 is configured to drain the reacted fluid 101' from the heat-transfer bed 110. Accordingly, the fluid 101 flows from the top to the bottom of the heat-transfer bed 110 through the heat storage material 115. Heat energy previously stored in the top part of the heat storage material 115 is used to heat up the fluid 101 and causes the fluid 101 to react. The heat storage material 115 at the bottom part recovers the excess heat energy from the reacted fluid 101'. For example, as the fluid 101 passes from the top part to the bottom part of the heat storage material 115, VOCs in the fluid 101 may get hot enough to undergo thermal oxidation to water vapor and carbon dioxide.

FIG. 2 illustrates the fluid reactor device 100 during a time period in which the second plenum 130 is configured to supply the fluid 101 to the heat-transfer bed 110 and the first plenum 120 is configured to drain the reacted fluid 101' from the heat-transfer bed 110. Accordingly, the fluid 101 flows from the bottom to the top of the heat-transfer bed 110 through the heat storage material 115. Heat energy previously stored in the bottom part of the heat storage material 115 is used to heat up the fluid 101 and causes the fluid 101 to react. The heat storage material 115 at the top part recovers the heat energy from the reacted fluid 101'.

The periodic reversion of the flow direction of the fluid 101 through the heat storage material 115 may allow to maintain a high heat exchange efficiency of the heat storage material 115 (e.g. higher than 95%). Accordingly, the fluid reactor device 110 may recover substantially all the heat needed for sustaining a needed reaction temperature in the heat-transfer bed 110 (e.g. an oxidation temperature or a reduction temperature). For example, irrespective of the flow direction of the fluid 101 through the heat storage material 115, a temperature of the reacted fluid 101' may be less than 100° C. higher than that of the fluid 101 supplied to the heat-transfer bed 110 (e.g. the temperature may be only 20° C. to 50° C. higher). Further, the periodic reversion of the flow direction of the fluid 101 may allow to maintain a predetermined temperature profile of the heat-transfer bed 110 along the extension of the heat-transfer bed 110 between the first plenum 110 and the second plenum 120 (i.e. along the vertical extension of the heat-transfer bed in the example of FIG. 1*b* and FIG. 2). In particular, the periodic reversion of the flow direction of the fluid 101 may allow to keep the hottest zone near a center plane of the heat-transfer bed 110 along the extension of the heat-transfer bed 110 between the first plenum 110 and the second plenum 120.

During operation of the fluid reactor device 100, the heat storage material 115 may exhibit a predefined temperature suitable for thermal reaction of the fluid 101. For example, the predefined temperature may be more than approx. 600° C., 800° C. or 1000° C. The fluid reactor device 100 may according to some examples of the present disclosure comprise an electrical heater (not illustrated in FIG. 1*b* and FIG. 2) configured to heat the heat storage material to the predefined temperature. It is to be noted that the electrical heater is not mandatory. The electrical heater may, e.g., be a grid of electrical coils arranged in the heat storage material 115. The electrical heater may, e.g., be used to initially heat the heat storage material 115 to the predefined temperature.

According to some examples of the present disclosure, catalyst material for lowering a reaction temperature of the fluid 101 may be arranged within the heat-transfer bed 110. Accordingly, the needed temperature for the reaction of the fluid 101 (e.g. oxidation or rection) may be lower such that the fluid reactor device 100 may operate at lower temperatures. For example, one or more layer of catalyst material may be provided separate from the heat storage material. One or more layer of catalyst material may, e.g., be attached to one or both ends of the heat-transfer bed 110 along the (possible) flow directions of the fluid (e.g. near the first opening 111 and the second opening 112). Alternatively or additionally, the heat storage material 115 in the heat-transfer bed 110 (e.g. cordierite) may at least in part be coated with and/or comprise (contain) catalyst material or catalytically active components. Further alternatively or additionally, catalyst material may be admixed to the heat storage material 115 in the heat-transfer bed 110. Still further alternatively or additionally, a first part of the heat storage material 115 in the heat-transfer bed 110 may be coated with and/or comprise (contain) catalyst material or catalytically active components, whereas a second part of the heat storage material 115 in the heat-transfer bed 110 does not comprise catalyst material and catalytically active components. The first part and the second part of the heat storage material 115 may be admixed or be provided as different layers in the heat-transfer bed 110. For example, one or more oxidation catalysts and/or one or more reduction catalysts may be used. However, the present disclosure is not limited thereto. Also other types of catalysts may be used.

In case the fluid reactor device 100 is a fluid purification device, the fluid reactor device may, e.g., purify the fluid 101 by Regenerative Thermal Oxidation (RTO). In other examples of the present disclosure, the fluid purification device may purify the fluid 101 by Regenerative Catalytic Oxidation (RCO). For example, the fluid purification device may be configured to purify the fluid 101 by flameless RTO or flameless RCO. However, the present disclosure is not limited thereto. Also other reactions of the fluid 101 such as a reduction of fluid may be used.

Each of the first plenum 120 and the second plenum 130 comprises a respective housing 121, 131 attached to the heat-transfer bed 110 such that the respective volume enclosed by the respective housing 121, 131 forms a respective plenum space for alternatingly transporting the fluid 101 towards and transporting the reacted fluid 101' away from the heat-transfer bed 110. The first plenum 120 and the second plenum 130 may alternatingly be coupled to a respective one of a source providing/emitting the fluid 101 (e.g. a device such as a machine or a production facility emitting the fluid 101) and a receiver of the reacted fluid 101' (e.g. a chimney for releasing the reacted fluid 101' to the environment or another device or system for further treating the reacted fluid 101') by a coupling system (not illustrated in FIG. 1*b*). The coupling system may be part of the fluid reactor device 100 or be external to the fluid reactor device 100. The housing 121 of the first plenum 120 may according to examples of the present disclosure at least partly be formed of and/or be at least partly covered by a heat-insulating material to minimize heat loses over the housing 121 of the first plenum 120. Analogously, the housing 131 of the second plenum 130 may according to examples of the present disclosure at least partly be formed of and/or be at least partly covered by a heat-insulating material to minimize heat loses over the housing 131 of the second plenum 130.

Additionally, the fluid reactor device 100 comprises a (first) heat blocking element (structure, material, device, means) 140 arranged in (inside) the first plenum 120. The heat blocking element 140 is spaced apart from the heat-transfer bed 110 and is spaced apart from the housing 121 of the first plenum 120. The heat blocking element 140 extends beyond the first opening 111. A gap 160 is formed between a boundary 113 of the first opening 111 and a surface 141 of the heat blocking element 140 facing the first opening 111. In other words, the whole first opening 111 and a part of the heat insulating wall 118 surrounding the first opening 111 is covered by the heat blocking element 140. Accordingly, an orthogonal projection of the first opening 111 onto a surface 141 of the heat blocking element 140 facing the first opening 111 (the bottom surface of the heat blocking element 140 in the example of FIG. 1*b*) does not fully cover the surface 141 of the heat blocking element 140. The heat blocking element 140 is configured to limit heat emission from the heat storage material 115 into the first plenum 120. For example, the heat blocking element 140 may at least in part be formed of a material storing and/or reflecting at least part of the heat released from the heat-transfer bed 110 via the first opening 111. The heat blocking element 140 may be formed of any material able to withstand temperatures of up to 200° C., 250° C. or 300° C. and/or pressures up to two bar. Optionally, the heat blocking element 140 may be formed of material able to withstand acidic and/or corrosive media. For example, the heat blocking element 140 may at least in part be formed of plastics, carbon, glass fiber, metal (e.g. spring steel) or mixtures, composite and/or laminates thereof.

Due to the presence of the heat blocking element 140, heat released from the heat-transfer bed 110 via the first opening 111 is at least in part reflected back to the heat-transfer bed 110 and/or at least stored near the first opening 111 such that it may be used for heating the fluid 101 entering the heat-transfer bed 110.

Further, the presence of the heat blocking element 140 positively affects the flow distribution of the fluid 101. As illustrated in FIG. 1*b*, during a time period in which the first plenum 120 is configured to supply the fluid 101 to the heat-transfer bed 110, the fluid 101 travels through the first plenum 101 substantially along a first spatial direction $\vec{x}_1$. The first spatial direction $\vec{x}_1$ is substantially perpendicular to a second spatial direction $\vec{x}_2$ and a third spatial direction $\vec{x}_3$, which denote the main flow directions of the fluid through the through the heat storage material 115 (i.e. the direction from the first opening 111 to the second opening 112, and vice versa). In the example of FIG. 1*b*, the fluid 101 substantially travels from the left to the right. The static pressure of the fluid 101 in the first plenum 120 varies with the speed of the fluid 101. In particular, the static pressure of fluid 101 in the first plenum 120 increases if the speed of the fluid 101 decreases (the dynamic pressure of the fluid 101 on the other hand decreases if the speed of the fluid 101 decreases). The speed of the fluid 101 decreases along the first spatial direction $\vec{x}_1$ as indicated in FIG. 1*b* by the size of the reference signs "V" depicted in the first plenum 120, which decreases from the left to the right.

Due to the heat blocking element 140, the speed of the fluid 101 entering the heat-transfer bed 110 is highest at the edges of the heat-transfer bed 110 along the first spatial direction $\vec{x}_1$ (i.e. at the right and the left side of the heat-transfer bed 110 in the example of FIG. 1b). Further, the speed of the fluid 101 entering the heat-transfer bed 110 gets lower towards the middle (center) of the heat-transfer bed 110 along the first spatial direction $\vec{x}_1$. Lower speed of the fluid 101 means lower dynamic pressure and, hence, higher static pressure of the fluid 101. Therefore, the static pressure of the fluid 101 entering the heat-transfer bed 110 increases from the edges of the heat-transfer bed 110 towards the middle of the of the heat-transfer bed 110 along the first spatial direction $\vec{x}_1$. The static pressure of the fluid 101 entering the heat-transfer bed 110 is indicated in FIG. 1b by the size of the reference signs "P" depicted at the first opening 111, which increases from the edges to the middle of the first opening 111. The increase of the static pressure towards the middle of the first opening 111 results in a slightly angled flow of the fluid 101 through the heat storage material 115 of the heat-transfer bed 110 to the sides of the heat-transfer bed 110. In other words, some of the fluid 101 and also the excess heat generated during the reaction of the fluid 101 in the heat-transfer bed 110 is transported to the side portions of the heat-transfer bed 110 along the first spatial direction $\vec{x}_1$. This is indicated in FIG. 1b by the dotted arrows pointing from the first opening 111 to the second opening 112. As can be seen from FIG. 1b, the dotted arrows are slightly directed towards the lateral edges of the heat-transfer bed 110.

The increasing static pressure of the fluid 101 in the first plenum 120 in the volume above the heat blocking element 140 does, hence, not negatively affect the distribution of the fluid 101 in the heat-transfer bed 110.

Optionally, the fluid reactor device 100 may further comprise another (second) heat blocking element 150 arranged in (inside) the second plenum 130. The heat blocking element 150 is spaced apart from the heat-transfer bed 110 and is spaced apart from the housing 131 of the second plenum 130. The heat blocking element 150 extends beyond the second opening 112. Another gap 170 is formed between a boundary 115 of the second opening 112 and a surface 151 of the heat blocking element 150 facing the second opening 112. In other words, the whole second opening 112 and a part of the heat insulating wall 118 surrounding the second opening 112 is covered by the heat blocking element 150. Accordingly, an orthogonal projection of the second opening 112 onto a surface 151 of the heat blocking element 150 facing the second opening 112 (the top surface of the heat blocking element 150 in the example of FIG. 1b) does not fully cover the surface 151 of the heat blocking element 150. The heat blocking element 150 is configured to limit heat emission from the heat storage material 115 into the second plenum 130. Like the heat blocking element 140, the heat blocking element 150 may at least in part be formed of a material storing and/or reflecting at least part of the heat released from the heat-transfer bed 110 via the second opening 112.

Due to the presence of the heat blocking element 150, heat released from the heat-transfer bed 110 via the second opening 112 is at least in part reflected back to the heat-transfer bed 110 and/or at least stored near the second opening 112 such that it may be used for heating the fluid 101 entering the heat-transfer bed 110.

As indicated in FIG. 2 by the dotted arrows illustrating the flow distribution of the fluid 101 and pointing from the second opening 112 to the first opening 111, the heat blocking element 150 further positively affects the flow distribution of the fluid 101 during a time period in which the second plenum 130 is configured to supply the fluid 101 to the heat-transfer bed 110—analogous to what is described above for the heat blocking element 140.

Further, as indicated in FIG. 1b by the size of the reference signs "P" depicted at the second opening 112, the heat blocking element 150 may cause a corresponding distribution of the static pressure of the reacted fluid 101' leaving the heat-transfer bed 110. As can be seen from FIG. 1b, the static pressure of the reacted fluid 101' increases from the edges to the middle of the second opening 112 along the first spatial direction $\vec{x}_1$ due to the presence of the heat blocking element 150. This further supports the transport of the fluid 101 and the reacted fluid 101' to side portions of the heat-transfer bed 110 along the first spatial direction $\vec{x}_1$. As indicated in FIG. 2, the heat blocking element 140 has the same effect on the reacted fluid 101' leaving the heat-transfer bed 110 via the second opening 112 during the time period in which the second plenum 130 is configured to supply the fluid 101 to the heat-transfer bed 110.

It is to be noted that the second heat blocking element 150 is optional. Improved heat loss and improved flow distribution of the fluid 101 compared to conventional approaches may already be achieved when using only the heating blocking element 140.

Figure 3:
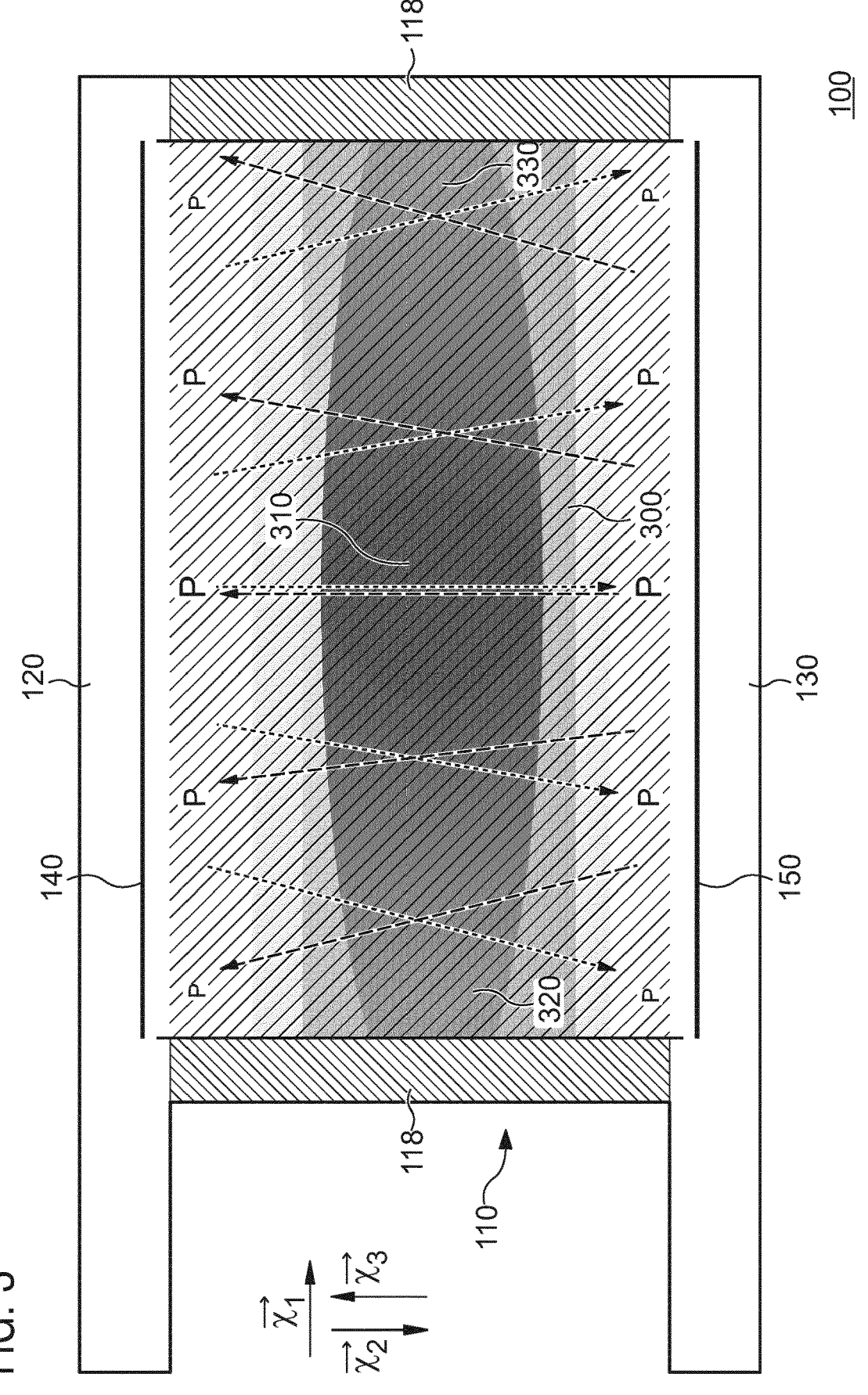
FIG. 3 illustrates an exemplary heat distribution in the second example of the fluid reactor device.

FIG. 3 illustrates an exemplary heat (temperature) distribution 300 in the heat storage material 115 of the heat-transfer bed 110 of the exemplary fluid reactor device 100 having the heat blocking elements 140, 150. The hottest zone is the center 310 of the heat-transfer bed 110. Due to heat losses at the thermally insulating wall 118, less heat would be stored at the lateral sides of the heat-transfer bed 110. However, due to the improved flow distribution of the fluid 101 caused by at least the heat blocking element 140 and optionally also the heat blocking element 150, some of the fluid 101 and also the excess heat generated during the reaction of the fluid 101 in the heat-transfer bed 110 is transported to the lateral side portions 320 and 330 of the heat-transfer bed 110 such that the wall loses may at least in part be compensated. In other words, excess heat is transferred from the center 310 of the heat-transfer bed 110 to the lateral side portions 320 and 330 of the heat-transfer bed 110 due to the improved flow distribution of the fluid 101.

Accordingly, a more even heat and temperature distribution in the heat-transfer bed 110 may be achieved such that the fluid 101 is sufficiently heated by the heat-transfer bed 110 irrespective of whether the fluid 101 flows through the center 310 or the lateral side portions 320 and 330 of the heat-transfer bed 110. Accordingly, no dedicated heating structure for heating the side portions of the heat-transfer bed 110 is needed. The total energy loss of the fluid reactor device 100 may be reduced.

Figure 4:
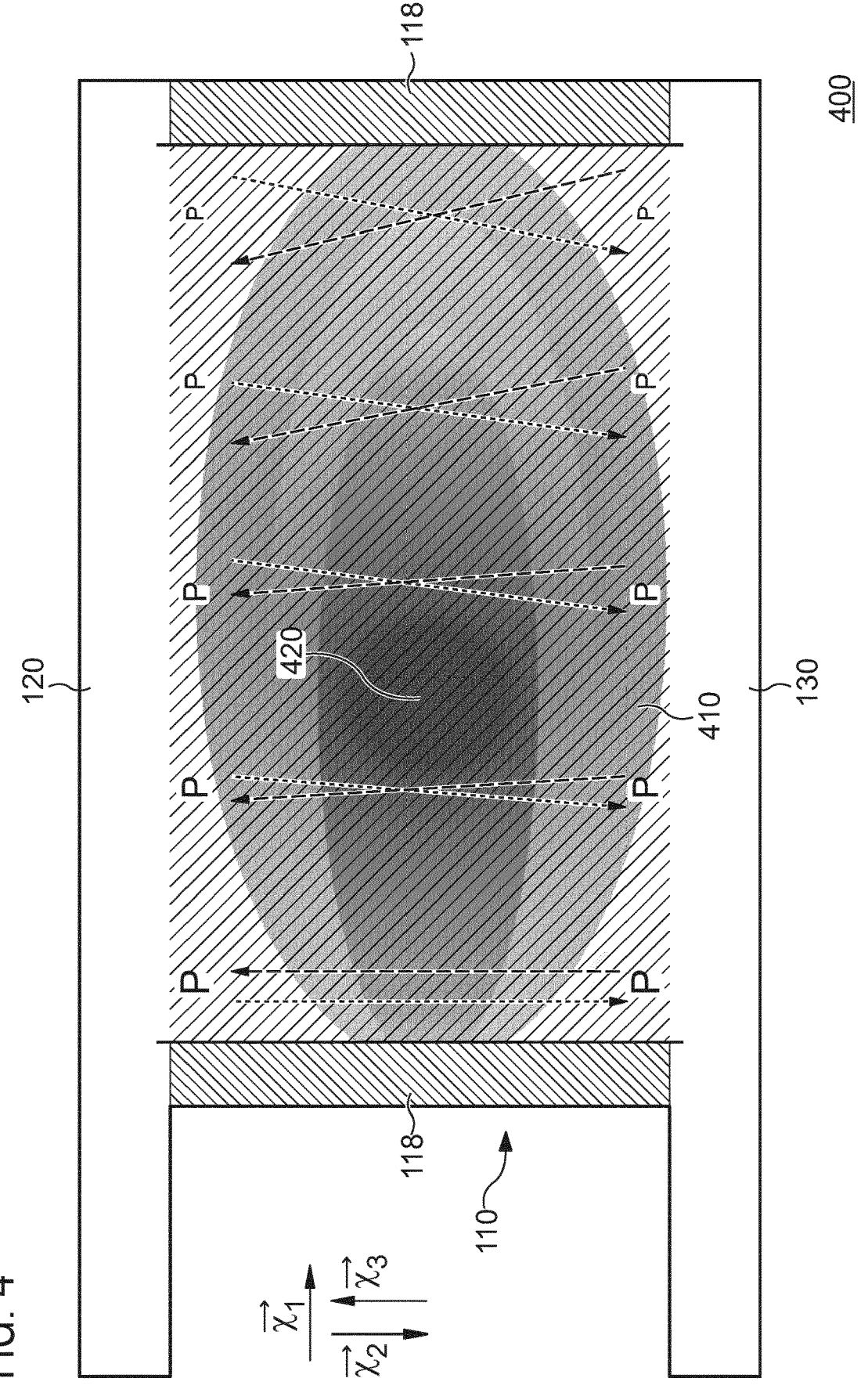
FIG. 4 illustrates an exemplary heat distribution in a prior art fluid purification device without heat blocking elements.

As a reference, FIG. 4 illustrates a prior art fluid purification device 400 not using heat blocking elements. Further illustrated in FIG. 4 is an exemplary heat distribution 410 in the heat storage material of the fluid purification device 400's heat-transfer bed 110. As can be seen from FIG. 4, the heat distribution 410 is uneven and causes an uneven temperature distribution in the heat-transfer bed 110. The hottest zone 420 is shifted towards the left side of the heat-transfer bed 110. Due to the losses at the thermally insulating wall 118, less heat is stored at the lateral edge portions of the heat-transfer bed 110. In particular, significantly less heat is stored in the right-side portion of the heat-transfer bed 110. This may result in insufficient heating of the fluid 101 when passing the heat-transfer bed 110 and, hence, negatively affect the purification of the fluid 101.

Figure 5:
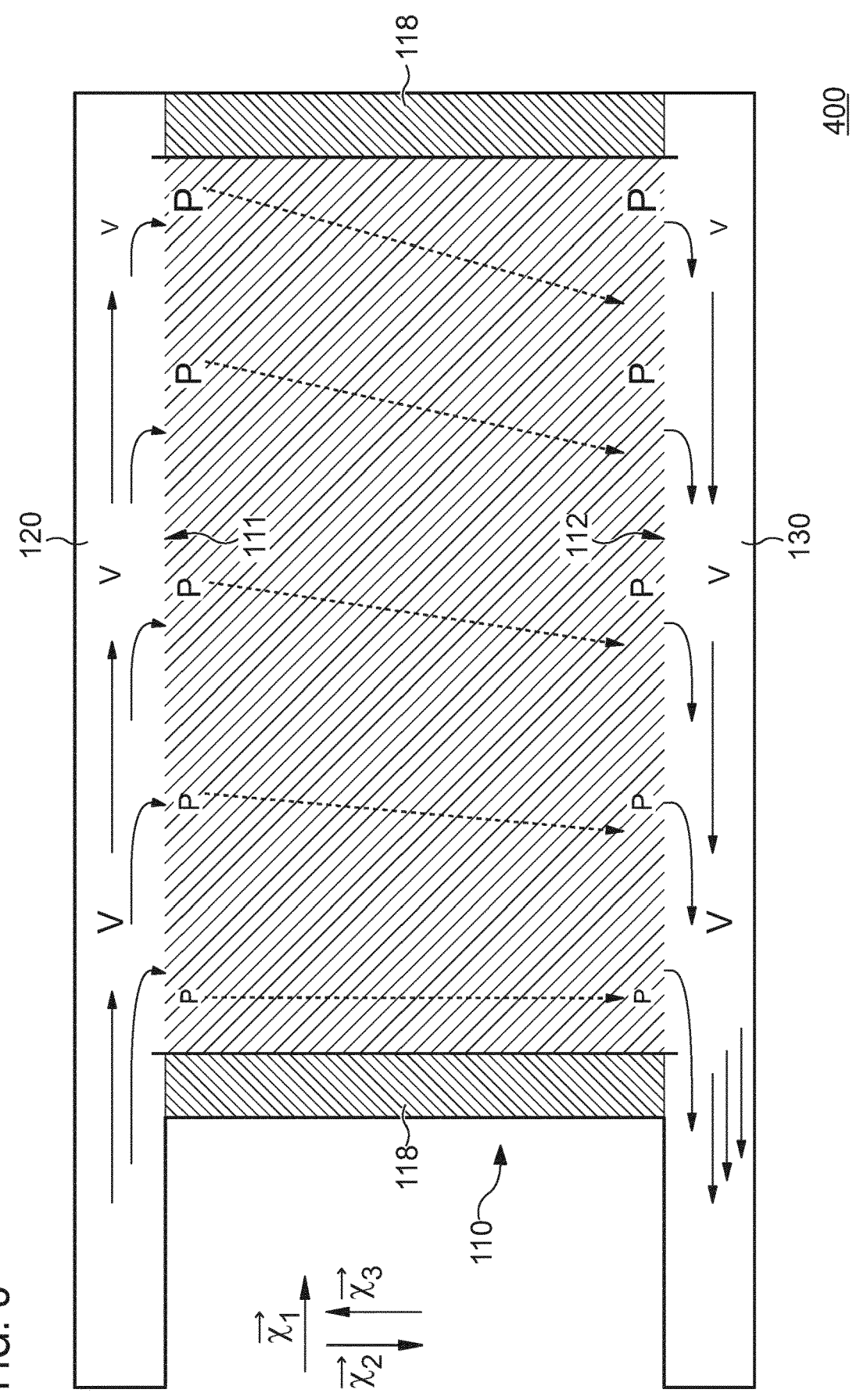
FIG. 5 illustrates an exemplary fluid flow in a prior art fluid purification device without heat blocking elements.

The heat distribution 410 illustrated in FIG. 4 is caused by the significantly different flow distribution of the fluid 101 in the fluid purification device 400. This exemplarily illustrated in FIG. 5. FIG. 5 illustrates the flow of the fluid 101 through the fluid purification device 400 during a time period in which the first plenum 120 is configured to supply the fluid 101 to the heat-transfer bed 110.

Analogous to the situation illustrated in FIG. 1b, the fluid 101 travels through the first plenum 101 substantially along the first spatial direction $\vec{x}_1$. The speed of the fluid 101 decreases along the first spatial direction $\vec{x}_1$ as indicated in FIG. 5 by the size of the reference signs "V" depicted in the first plenum 120, which decreases from the left to the right. Accordingly, the static pressure of fluid 101 in the first plenum 120 increases along the first spatial direction $\vec{x}_1$. The increase of the static pressure of the fluid 101 entering the heat-transfer bed 110 along the first spatial direction $\vec{x}_1$ is indicated in FIG. 5 by the size of the reference signs "P" depicted at the first opening 111, which increases along the first spatial direction $\vec{x}_1$ (i.e. from the left to the right).

The increasing static pressure along the first spatial direction $\vec{x}_1$ causes a flow of the fluid 101 through the heat storage material of the heat-transfer bed 110 towards regions with lower static pressure. This causes an increase of the static pressure of the reacted fluid 101' leaving the heat-transfer bed 110 along the first spatial direction $\vec{x}_1$ is indicated in FIG. 5 by the size of the reference signs "P" depicted at the second opening 112, which increases along the first spatial direction $\vec{x}_1$. In the example of FIG. 5, the flow of the fluid 101 through the heat storage material of the heat-transfer bed 110 is oriented towards the left side of the heat-transfer bed 110 such that effectively less heat is stored in the heat storage material at the right side of the heat-transfer bed 110. Accordingly, insufficient compensation of the heat loses through the thermally insulating wall 118 occurs, which leads to the heat distribution 410 in the heat storage material of the fluid purification device 400's heat-transfer bed 110 as illustrated in FIG. 4. This may result in insufficient heating of the fluid 101 passing the heat-transfer bed 110 at the right side and, hence, negatively affect the purification of the fluid 101.

Further, heat released from the heat-transfer bed 110 via the first opening 111 may distribute over the entire first plenum and lead to additional heat losses.

The above applies vice versa during a time period in which the second plenum 130 is configured to supply the fluid 101 to the heat-transfer bed 110.

As described above, using the heating blocking element 140 and optionally further the heating blocking element 150 may improve heat loss and flow distribution of the fluid 101 compared to the fluid purification device 400.

Returning back to FIG. 1b, it can be seen that the surface 141 of the heat blocking element 140 extends substantially parallel to the first opening 111. The distance between the heat blocking element 140 and the boundary 113/the heat-transfer bed 110 is selected such that the gap 160 acts as a nozzle for the fluid 101 when flowing from the first plenum 120 to the heat-transfer bed 110. The gap 160 acting as nozzle for the fluid 101 may allow to generate the above described flow distribution of the fluid 101 in the heat-transfer bed 110.

For defining the gap 160 between the surface 141 of the heat blocking element 140 and the boundary 113 of the first opening 111, the heat-transfer bed 110 may comprise one or more protrusion 114 (e.g. a ledge) formed at the boundary 113 of the first opening 111. However, it is to be noted that the one or more protrusion 114 are optional and in general not necessary for defining the gap 160 between the surface 141 of the heat blocking element 140 and the boundary 113 of the first opening 111.

Analogously, as illustrated in FIG. 2, the surface 151 of the heat blocking element 150 extends substantially parallel to the second opening 112. The distance between the heat blocking element 150 and the boundary 115/the heat-transfer bed 110 is selected such that the gap 170 acts as a nozzle for the fluid 101 when flowing from the second plenum 130 to the heat-transfer bed 110. The gap 170 acting as nozzle for the fluid 101 may analogously allow to generate the above described flow distribution of the fluid 101 in the heat-transfer bed 110.

For defining the gap 170 between the surface 151 of the heat blocking element 150 and the boundary 113 of the second opening 112, the heat-transfer bed 110 may comprise one or more other protrusion 116 (e.g. a ledge) formed at the boundary 115 of the second opening 112. However, it is to be noted that the one or more protrusion 116 are optional and in general not necessary for defining the gap 170 between the surface 151 of the heat blocking element 150 and the boundary 115 of the second opening 112.

As indicated in FIG. 1b by the arrows indicating the fluid 101 and passing through the heat blocking element 140, a plurality of recesses for passthrough of the fluid 101 may optionally be formed in the heat blocking element 140. The plurality of recesses extend from the surface 141 of the heat blocking element, which faces the first opening 111, to another opposite surface 142 of the heat blocking element 140, which faces the housing 121 of the first plenum 120. The plurality of recesses in the heat blocking element 140 may support the generation of the above described flow distribution of the fluid 101 in the heat-transfer bed 110. According to examples of the present disclosure, a respective size of the plurality of recesses for passthrough of the fluid 101 and/or a number of recesses for passthrough per unit area may increase along the first spatial direction $\vec{x}_1$. Increasing the respective size of the plurality of recesses for passthrough of the fluid 101 and/or the number of recesses for passthrough per unit area along the first spatial direction $\vec{x}_1$ may allow to lower the effective resistance of the heat blocking element 140 for the fluid 101 when entering the heat-transfer bed 110 and, hence, support the generation of the above described flow distribution of the fluid 101 in the heat-transfer bed 110.

The heat blocking element 140 may optionally comprise one or more surface structure for controlling a flow direction and/or flow characteristics of the fluid 101 locally. In other words, one or more of the surface 141 and the surface 142 may be structured for controlling the flow direction and/or the flow characteristics of the fluid 101 locally in order to support the generation of the above described flow distribution of the fluid 101 in the heat-transfer bed 110. For example, one or more guide baffle and/or one or more orifice may be used as surface structures.

As indicated in FIG. 2 by the arrows indicating the fluid 101 and passing through the heat blocking element 150, another plurality of recesses for passthrough of the fluid 101 may optionally be formed in the heat blocking element 150. The plurality of recesses extend from the surface 151 of the heat blocking element, which faces the second opening 112, to another opposite surface 152 of the heat blocking element 150, which faces the housing 131 of the second plenum 130. Analogously to what is described above, the plurality of recesses in the heat blocking element 150 may support the generation of the above described flow distribution of the fluid 101 in the heat-transfer bed 110. Also in the heat blocking element 150, the respective size of the plurality of recesses for passthrough of the fluid 101 and/or a number of recesses for passthrough per unit area may increase along the first spatial direction $\overrightarrow{x_1}$.

As can be seen from FIG. 1b, the plurality of recesses in the heat blocking element 150 further allow the reacted fluid 101' to more easily leave the heat-transfer bed 110. Analogously, the plurality of recesses in the heat blocking element 140 further allow the reacted fluid 101' to more easily leave the heat-transfer bed 110 as can be seen from FIG. 2.

Figure 6:
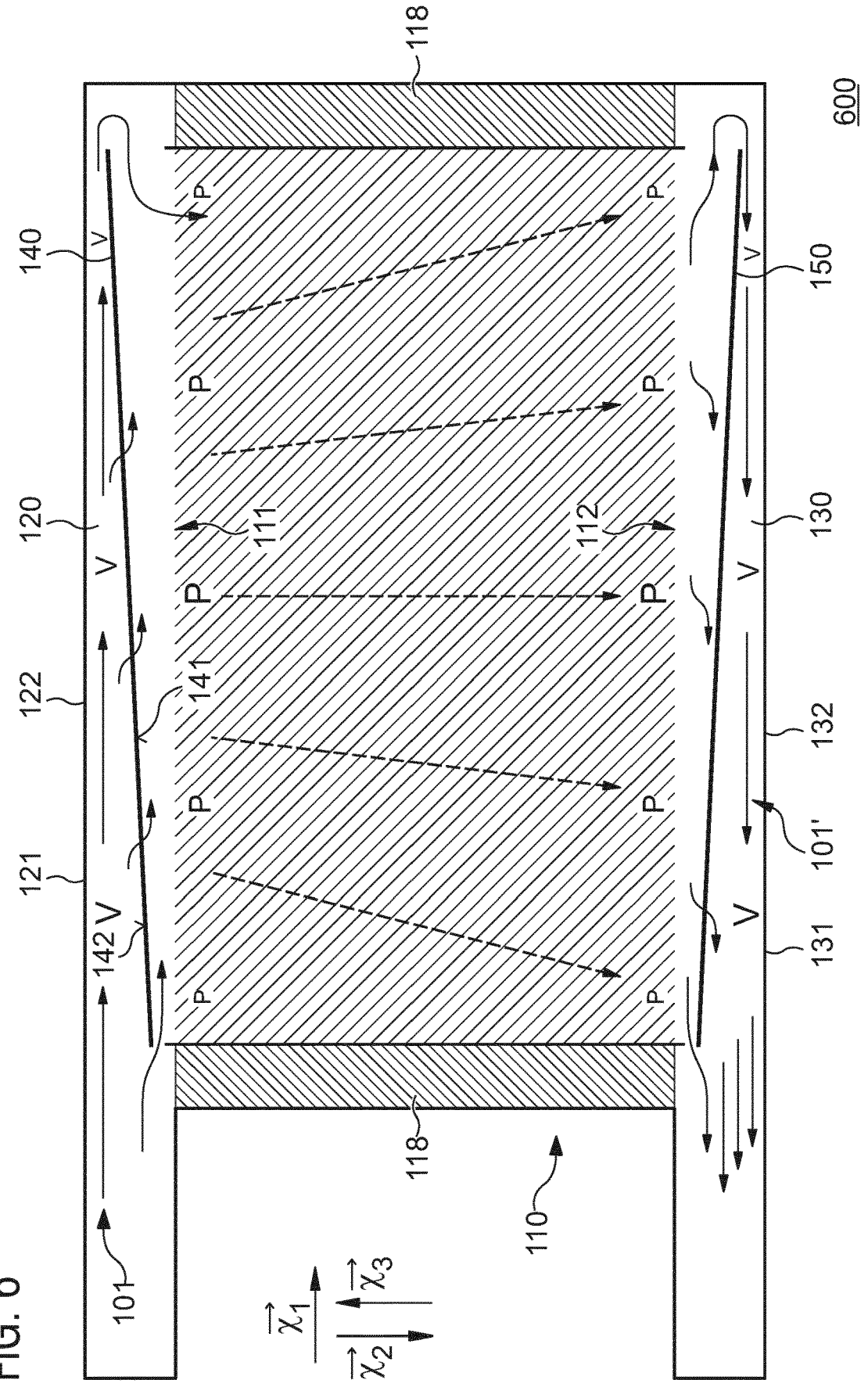
FIG. 6 illustrates a sectional view of a third example of a fluid reactor device.

In the example of FIG. 1b, the heat blocking element 140 extends substantially parallel to the first opening 111 and the heat blocking element 150 extends substantially parallel to the second opening 112. However, the present disclosure is not limited thereto. FIG. 6 illustrates another fluid reactor device 600 with tilted heat blocking elements. FIG. 6 illustrates the fluid reactor device 600 during a time period in which the first plenum 120 is configured to supply the fluid 101 to the heat-transfer bed 110 and the second plenum 140 is configured to drain the reacted fluid 101' from the heat-transfer bed 110.

In the example of FIG. 6, the surface 141 of the heat blocking element 140, which faces the first opening 111, is tilted with respect to the first opening 111. Accordingly, a distance between the surface 141 of the heat blocking element 140 and the first opening 111 increases along the first spatial direction $\overrightarrow{x_1}$. Analogously, a distance between the opposite surface 142 of the heat blocking element 140 and a wall 122 of the first plenum's housing 121 decreases along the first spatial direction $\overrightarrow{x_1}$. The first opening 111 and the wall 122 of the first plenum's housing 121 are arranged on opposite sides of the heat blocking element 140.

Analogously, the surface 151 of the heat blocking element 150, which faces the second opening 112, may be tilted with respect to the second opening 112. Accordingly, a distance between the surface 151 of the heat blocking element 150 and the second opening 112 increases along the first spatial direction $\overrightarrow{x_1}$. Analogously, a distance between the opposite surface 152 of the heat blocking element 150 and a wall 132 of the second plenum's housing 131 decreases along the first spatial direction $\overrightarrow{x_1}$. The second opening 112 and the wall 132 of the second plenum's housing 131 are arranged on opposite sides of the heat blocking element 150.

As described above for the parallel heat blocking elements 140 and 150, also the tilted heat blocking elements 140 and 150 in the example of FIG. 6 may allow to improve heat loss and flow distribution of the fluid 101. The tilt angles of the heat blocking elements 140 and 150 with respect to the respective one of the first opening 111 and the second opening 112 may be identical to each other as illustrated in FIG. 6. However, the present disclosure is not limited thereto. In other examples, different tilt angles may be used for the heat blocking elements 140 and 150.

In the above examples, the heat blocking elements 140 and 150 do not comprise any moving parts. However, the present disclosure is not limited thereto. In the following, examples will be described with reference to FIG. 7, FIG. 8 and FIG. 9, in which the heat blocking element 140 comprises at least one respective movable element for adjusting the gap to the boundary of the respective opening 111. The respective fluid reactor device is illustrated in each of FIG. 7, FIG. 8 and FIG. 9 during a time period in which the first plenum 120 is configured to supply the fluid 101 to the heat-transfer bed 110 and the second plenum 140 is configured to drain the reacted fluid 101' from the heat-transfer bed 110.

Figure 7:
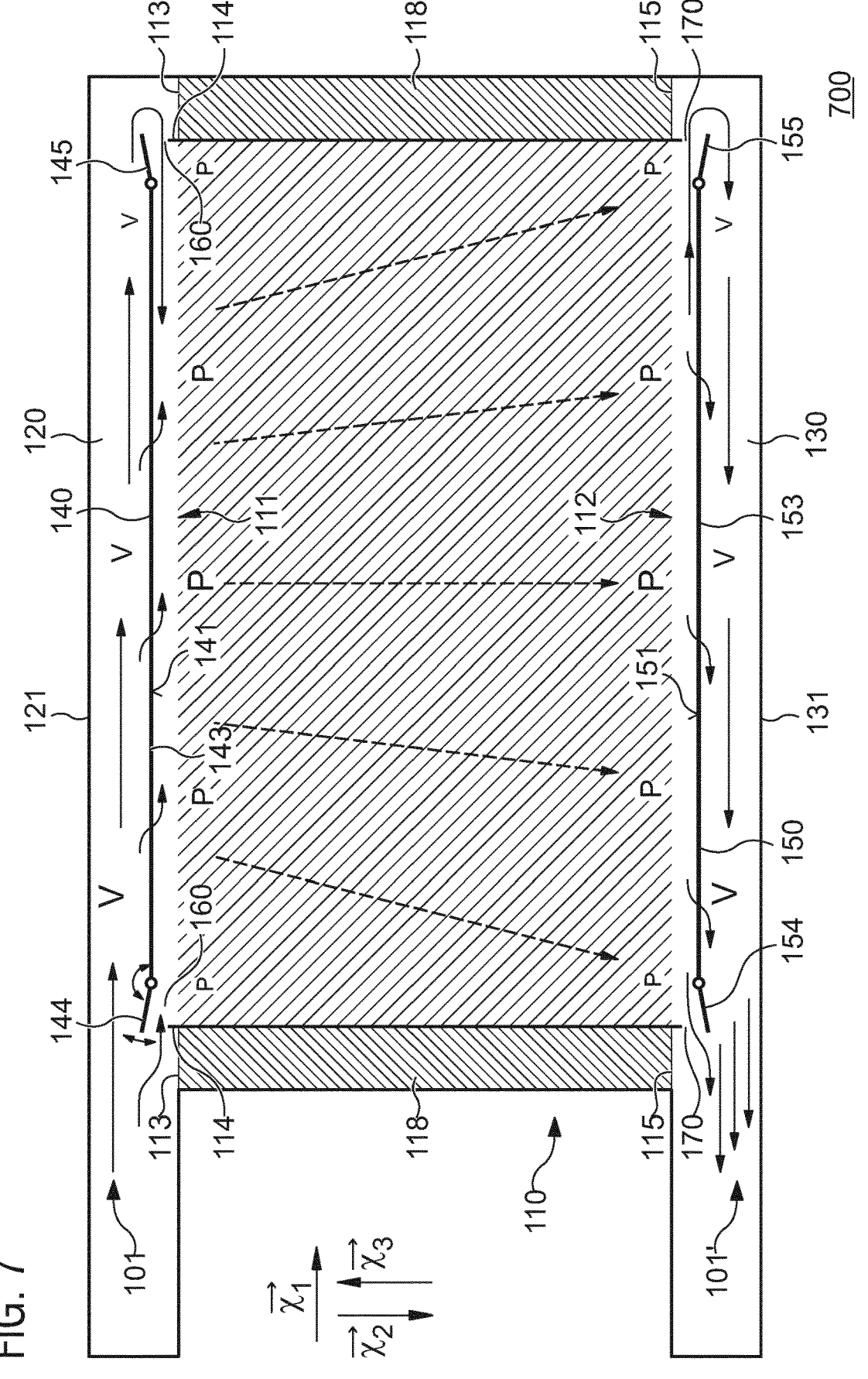
FIG. 7 illustrates a sectional view of a fourth example of a fluid reactor device.

In the fluid reactor device 700 illustrated in FIG. 7, the heat blocking element 140 comprises two movable elements 144 and 145 for adjusting the gap 160 between the boundary 113 of the first opening 111 and at least part of the surface 141 of the heat blocking element 140. The two movable elements 144 and 145 are edge portions of the heat blocking element 140 coupled to a central portion 143 of the heat blocking element 140. The two movable elements 144 and 145 are movable with respect the central portion 143 of the heat blocking element 140.

Analogously, the heat blocking element 150 comprises two movable elements 154 and 155 for adjusting the gap 170 between the boundary 115 of the second opening 112 and at least part of the surface 151 of the heat blocking element 150. The two movable elements 154 and 155 are edge portions of the heat blocking element 150 coupled to a central portion 153 of the heat blocking element 150. The two movable elements 154 and 155 are movable with respect the central portion 153 of the heat blocking element 150.

Figure 8:
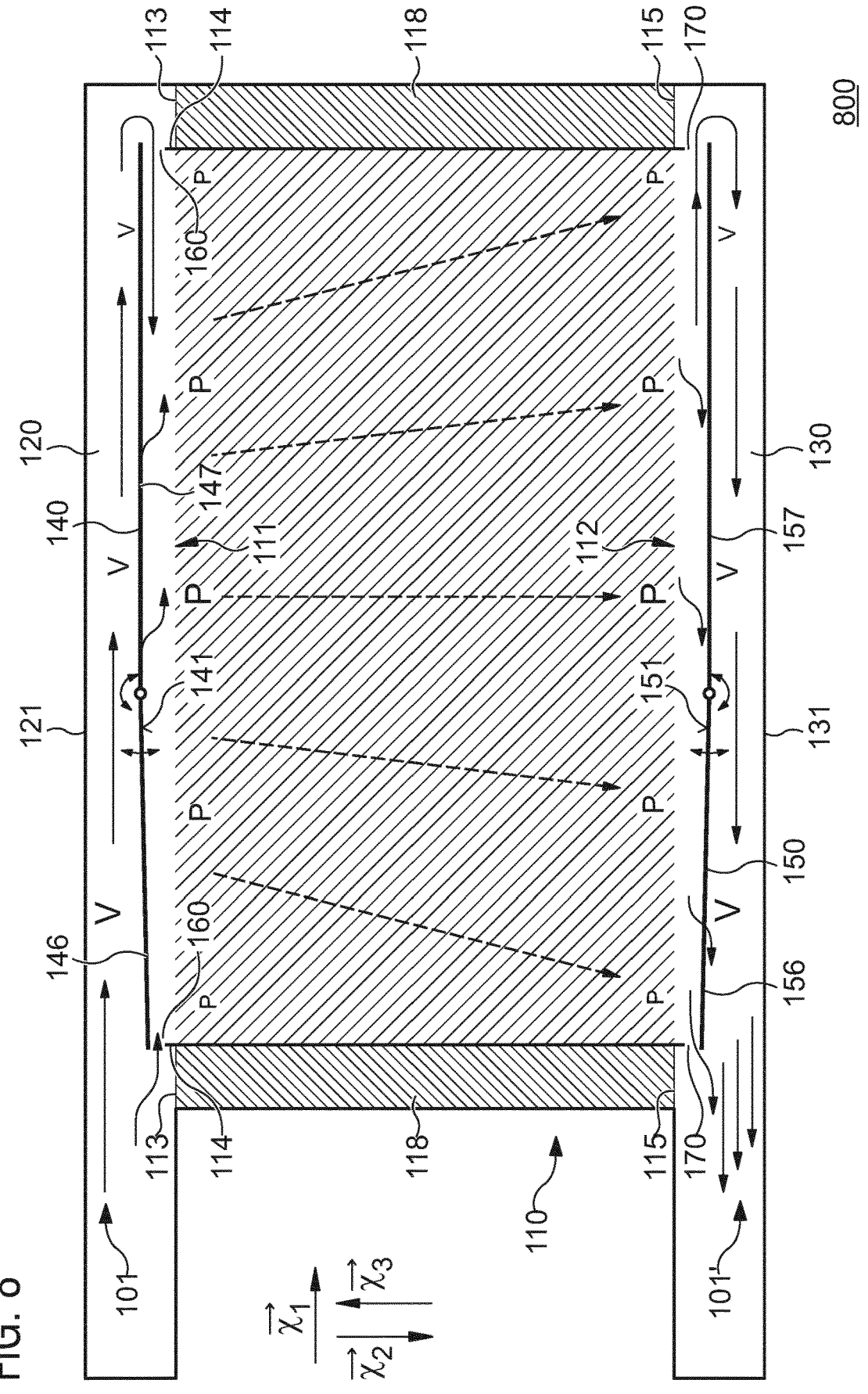
FIG. 8 illustrates a sectional view of a fifth example of a fluid reactor device.

In the fluid reactor device 800 illustrated in FIG. 8, the heat blocking element 140 comprises one movable element 146 for adjusting the gap 160 between the boundary 113 of the first opening 111 and a part of the surface 141 of the heat blocking element 140. The movable element 146 is coupled to a static element 147 of the heat blocking element 140. The movable element 146 is movable with respect the static element 147 of the heat blocking element 140.

Analogously, the heat blocking element 150 comprises one movable element 156 for adjusting the gap 170 between the boundary 115 of the second opening 112 and a part of the surface 151 of the heat blocking element 150. The movable element 156 is coupled to a static element 157 of the heat blocking element 150. The movable element 156 is movable with respect the static element 157 of the heat blocking element 150.

Figure 9:
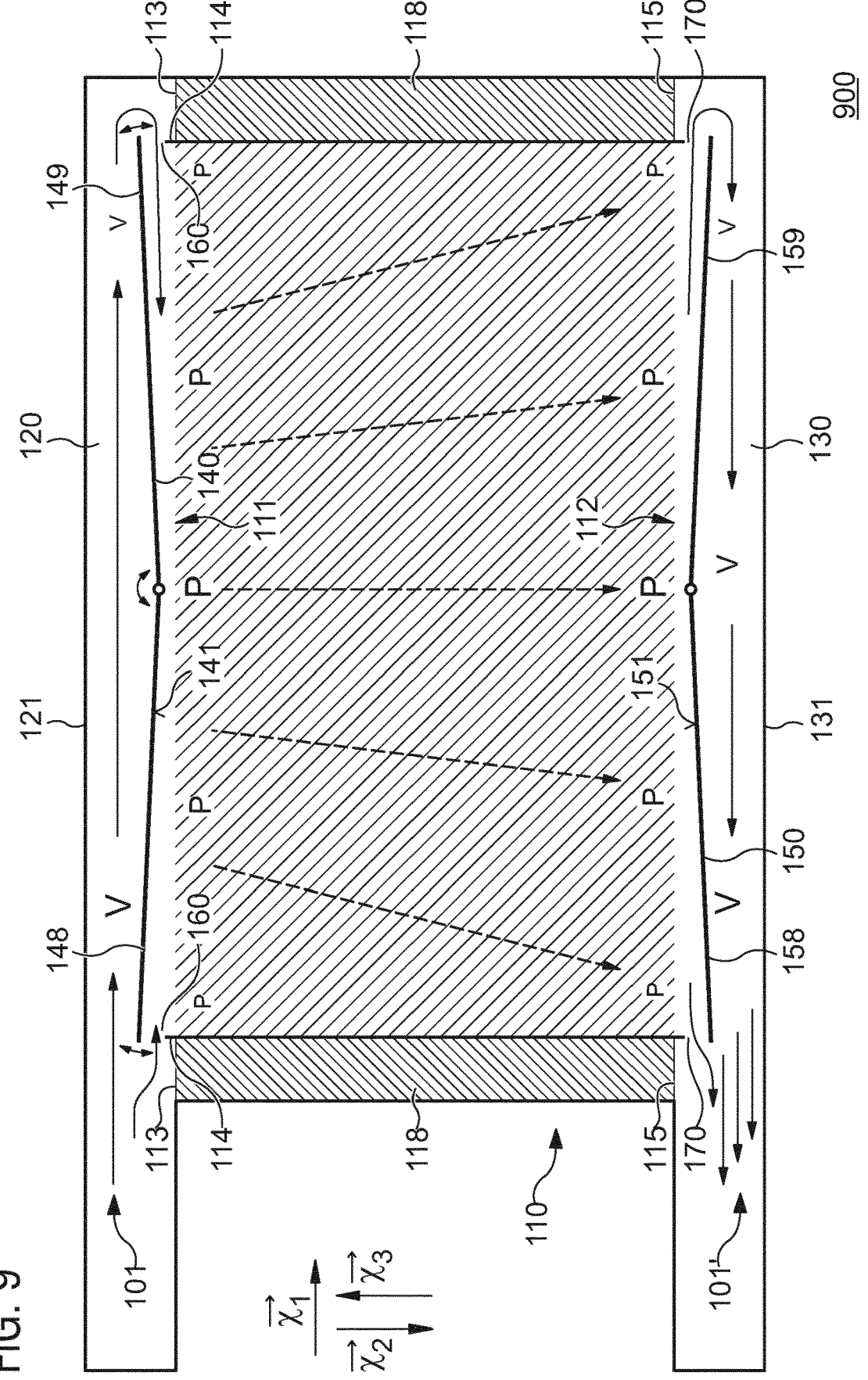
FIG. 9 illustrates a sectional view of a sixth example of a fluid reactor device.

In the fluid reactor device 900 illustrated in FIG. 9, the heat blocking element 140 comprises two movable elements 148 and 149 for adjusting the gap 160 between the boundary 113 of the first opening 111 and the surface 141 of the heat blocking element 140. The two movable elements 148 and 149 are coupled to and moveable with respect to each other.

Analogously, the heat blocking element 150 comprises two movable elements 158 and 159 for adjusting the gap 170 between the boundary 115 of the second opening 112 and the surface 151 of the heat blocking element 150. The two movable elements 158 and 159 are coupled to and moveable with respect to each other.

The heat blocking element 140 in each of the fluid reactor devices 700, 800 and 900 illustrated FIG. 7, FIG. 8 and FIG. 9 comprises at least one movable element for adjusting the gap 160 between the boundary 113 of the first opening 111 and at least part of the surface 141 of the heat blocking element 140. Analogously, the heat blocking element 150 in each of the fluid reactor devices 700, 800 and 900 comprises at least one movable element for adjusting the gap 170 between the boundary 115 of the second opening 112 and at least part of the surface 151 of the heat blocking element 150.

For moving the at least one movable element of the heat blocking element 140, each of the fluid reactor devices 700, 800 and 900 may further comprise at least one actuator (not illustrated) coupled to the at least one movable element of the heat blocking element 140. The at least one actuator is configured to adjust a respective positioning and/or orientation of the at least one movable element of the heat blocking element 140 relative to the boundary 113 of the first opening 111.

For moving the at least one movable element of the heat blocking element 150, each of the fluid reactor devices 700, 800 and 900 may further comprise at least one further actuator (not illustrated) coupled to the at least one movable element of the heat blocking element 150. The at least one actuator is configured to adjust a respective positioning and/or orientation of the at least one movable element of the heat blocking element 150 relative to the boundary 115 of the second opening 112.

By varying the distance of the at least one movable element of the heat blocking element 140 relative to the boundary 113 of the first opening 111, the variation of the static pressure at the first opening 111 may be adjusted (controlled) along the first spatial direction $\vec{x}_1$ in order to support the generation of the above described flow distribution of the fluid 101 in the heat-transfer bed 110. Analogously, the variation of the static pressure at the second opening 112 may be adjusted (controlled) along the first spatial direction $\vec{x}_1$ by varying the distance of the at least one movable element of the heat blocking element 150 relative to the boundary 115 of the second opening 112.

The at least one actuator for varying the distance of the at least one movable element of the heat blocking element 140 relative to the boundary 113 of the first opening 111 may, e.g., comprise a hydraulic system and/or a combination of an electric motor and a drive system for moving the at least one movable element of the heat blocking element 140. The heat blocking element 150 may be implemented analogously.

The at least one actuator for varying the distance of the at least one movable element of the heat blocking element 140 relative to the boundary 113 of the first opening 111 may, e.g., be configured to adjust the distance of the at least one movable element of the heat blocking element 140 relative to the boundary 113 of the first opening 111 based on a temperature and/or a pressure and/or a differential pressure in the first plenum 120 as these quantities affect the variation of the static pressure at the first opening 111. Alternatively or additionally, the at least one actuator for varying the distance of the at least one movable element of the heat blocking element 140 relative to the boundary 113 of the first opening 111 may, e.g., be configured to adjust the distance of the at least one movable element of the heat blocking element 140 relative to the boundary 113 of the first opening 111 time based and/or event based. For example, the distance may be varied in a time period directly before or after changing the overall fluid direction inside the first plenum 120 and the second plenum 130, or in case of exceptional events such as concentration peaks or downs in the fluid (e.g. a gas stream) entering the fluid reactor device. Analogously, the at least one actuator for varying the distance of the at least one movable element of the heat blocking element 150 relative to the boundary 115 of the second opening 112 may, e.g., be configured to adjust the distance of the at least one movable element of the heat blocking element 150 relative to the boundary 115 of the second opening 112 based on a temperature and/or a pressure and/or a differential pressure in the second plenum 130 (as these quantities affect the variation of the static pressure at the second opening 112) and/or time based and/or event based.

For example, the at least one actuator for varying the distance of the at least one movable element of the heat blocking element 140 relative to the boundary 113 of the first opening 111 and the at least one actuator for varying the distance of the at least one movable element of the heat blocking element 150 relative to the boundary 115 of the second opening 112 may comprise or be coupled to one or more control circuitry for controlling the operation of the respective at least one actuator based on the temperature and/or the pressure and/or the differential pressure in the respective plenum and/or time based and/or event based. According to examples, the respective fluid reactor device may comprise one or more sensor coupled to the one or more control circuitry and configured to measure the temperature and/or the pressure and/or the differential pressure in the respective plenum.

For example, the one or more control circuitry may be a single dedicated processor, a single shared processor, or a plurality of individual processors, some of which or all of which may be shared, a digital signal processor (DSP) hardware, an application specific integrated circuit (ASIC), or a field programmable gate array (FPGA). The one or more control circuitry may optionally be coupled to, e.g., read only memory (ROM) for storing software (e.g. storing a program for controlling the respective at least one actuator), random access memory (RAM) and/or non-volatile memory.

Figure 10:
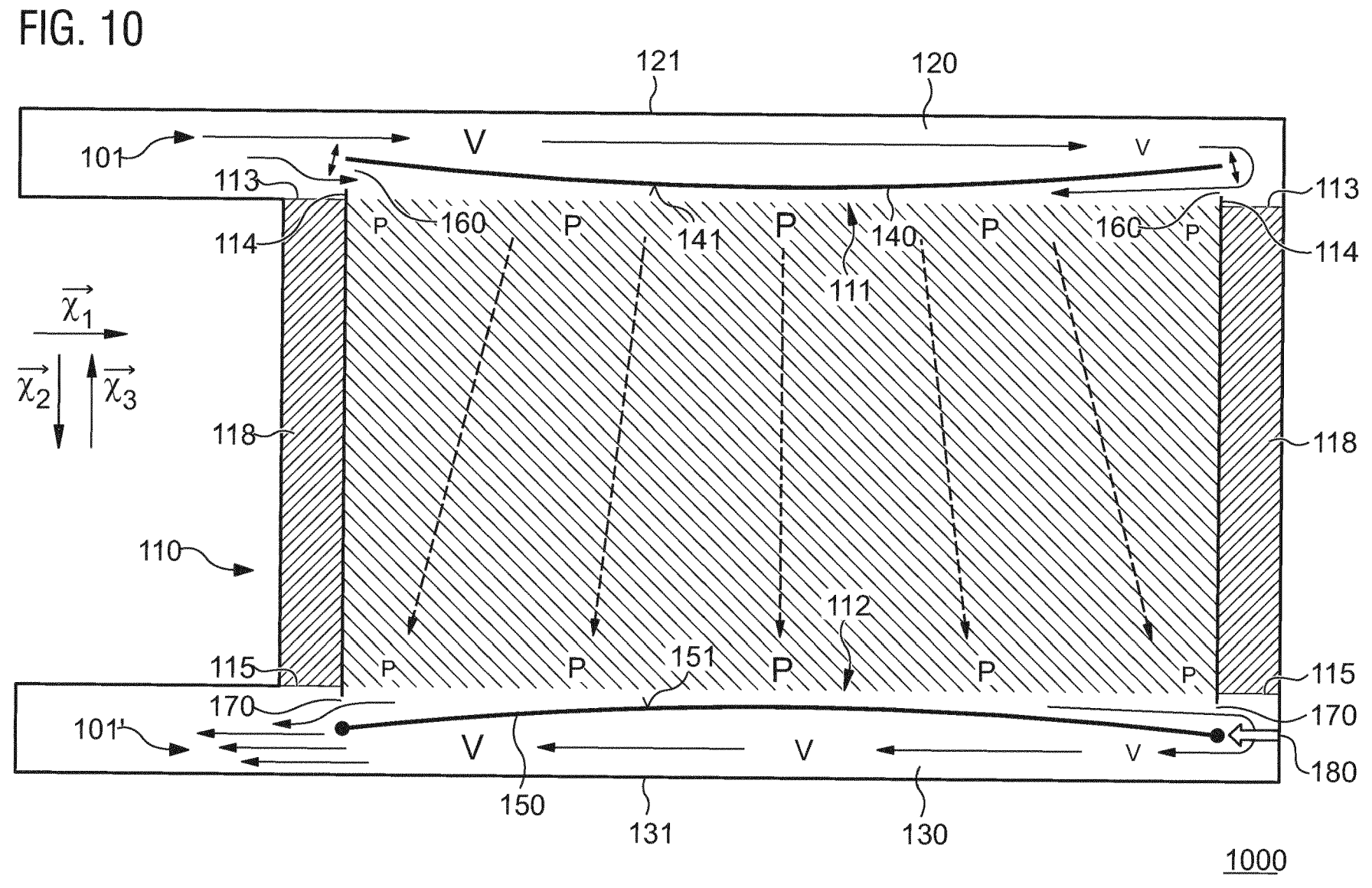

FIG. 10 illustrates another exemplary fluid reactor device 1000 using bendable heat blocking elements. The fluid reactor device 1000 is illustrated in FIG. 10 during a time period in which the first plenum 120 is configured to supply the fluid 101 to the heat-transfer bed 110 and the second plenum 140 is configured to drain the reacted fluid 101' from the heat-transfer bed 110.

The heat blocking element 140 is bendable. In particular, the heat blocking element 140 comprises one or more bimetal structure configured to bend the heat blocking element based on a temperature in the first plenum 120 for adjusting the gap 160 between the boundary 113 of the first opening 111 and at least part of the surface 141 of the heat blocking element 140. For example, the whole heat blocking element 140 may be formed as a bimetal structure for obtaining the temperature sensitive bending. In other examples, one or more bimetal structure may be formed in or on the heat blocking element 140 for obtaining the temperature sensitive bending.

By varying the distance of the at least one movable element of the heat blocking element 140 relative to the boundary 113 of the first opening 111, the variation of the static pressure at the first opening 111 may be adjusted (controlled) along the first spatial direction $\vec{x}_1$ in order to support the generation of the above described flow distribution of the fluid 101 in the heat-transfer bed 110.

An alternative bending configuration is illustrated in FIG. 10 for the heat blocking element 150. The heat blocking element 150 is bendable for adjusting the gap 170 between the boundary 115 of the second opening 112 and at least part of the surface 151 of the heat blocking element 150. For example, the heat blocking element 150 may at least in part be formed of a bendable/flexible material (e.g. the heat blocking element 150 may at least in part be formed of plastics, carbon, glass fiber, metal (e.g. spring steel) or mixtures, composite, laminates thereof—analogous to what is described above for the heat blocking element 140)).

For bending the heat blocking element 150, the fluid reactor device further comprises at least one actuator 180 configured to exert a force on the heat blocking element 150 for bending the heat blocking element 150. In the example of FIG. 10, one end of the heat blocking element 150 is fixed and the at least one actuator 180 exerts the force for bending the heat blocking element 150 on the other end of the heat blocking element 150. In other words, the at least one actuator 180 exerts a lateral force on the heat blocking element 150. However, the present disclosure is not limited thereto. For example, the at least one actuator 180 may exert the force on the heat blocking element 150 along a spatial direction, which is substantially perpendicular to the surface 151 of the heat blocking element 150 when the heat blocking element 150 is not bent (e.g. along the third spatial direction $x_3$). In this example, both ends of the heat blocking element 150 may be fixed.

The at least one actuator 180 may, e.g., be a stamp. However, it is to be noted that the present disclosure is not limited thereto. In general, any means that can be driven by, e.g., a hydraulic system or a (e.g. electric) motor to exert a force on the heat blocking element 150 may be used.

It is to be noted that in alternative examples, also the heat blocking element 150 may be based on a bimetal structure. In other words, analogously to the heat blocking element 140 described above, the heat blocking element 150 may comprise one or more bimetal structure configured to bend the heat blocking element 150 based on a temperature in the second plenum 130 for adjusting the gap 170 between boundary 115 of the second opening 112 and at least part of the surface 151 of the heat blocking element 150.

Similarly, it is to be noted that in alternative examples, also the heat blocking element 140 may be bent by at least one actuator. In other words, analogously to the heat blocking element 150 described above, the heat blocking element 140 may be bendable for adjusting the gap 160 between the boundary 113 of the first opening 111 and at least part of the surface 141 of the heat blocking element 140. Accordingly, the fluid reactor device may further comprise at least one actuator configured to exert a force on the heat blocking element 140 for bending the heat blocking element 140.

Analogously to what is described above with respect to FIG. 9, the respective at least one actuator for exerting the respective force on the respective one of the heat blocking element 140 and the heat blocking element 150 may be configured to exert the respective force based one a temperature and/or a pressure and/or a differential pressure in the respective one of first plenum 120 and the second plenum 130 as these quantities affect the variation of the static pressure at the respective one of the first opening 111 and the second opening 112.

Alternatively or additionally, the respective at least one actuator for exerting the respective force on the respective one of the heat blocking element 140 and the heat blocking element 150 may be configured to exert the respective force time based and/or event based. For example, the respective at least one actuator may change the force exerted on the respective one of the heat blocking element 140 and the heat blocking element 150 during a time period directly before or after changing the overall fluid direction inside the first plenum 120 and the second plenum 130, or in case of exceptional events such as concentration peaks or downs in the fluid (e.g. a gas stream) entering the fluid reactor device. The respective at least one actuator may comprise or be coupled to one or more control circuitry for controlling the operation of the respective at least one actuator based on the temperature and/or the pressure and/or the differential pressure in the respective plenum and/or time based and/or event based—analogously to what is described above with respect to FIG. 9.

Figure 11:
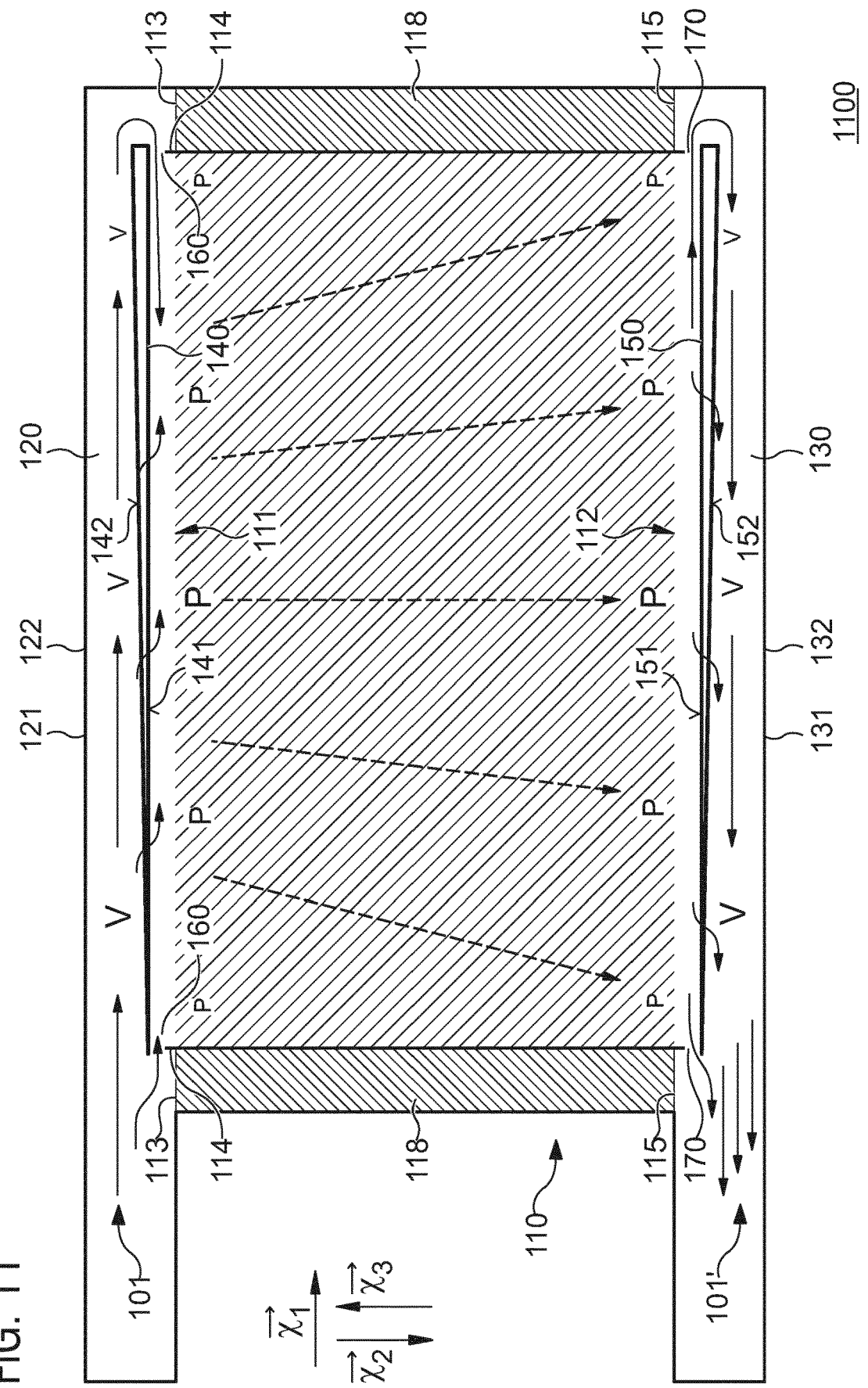
FIG. 11 illustrates a sectional view of an eighth example of a fluid reactor device.

In the above examples, the heat blocking elements 140 and 150 are plate-shaped. However, the present disclosure is not limited thereto. In general, the heat blocking elements 140 and 150 may exhibit any suitable shape. FIG. 11 illustrates another exemplary fluid reactor device 1100 using wedge-shaped heat blocking elements 140 and 150. The fluid reactor device 1100 is illustrated in FIG. 11 during a time period in which the first plenum 120 is configured to supply the fluid 101 to the heat-transfer bed 110 and the second plenum 140 is configured to drain the reacted fluid 101' from the heat-transfer bed 110.

The surface 141 of the heat blocking element 140 extends substantially parallel to the first opening 111 such that the gap 160 formed between the boundary 113 of the first opening 111 and the surface 141 of the heat blocking element 140 acts as a nozzle for the fluid 101 when flowing from the first plenum 120 to the heat-transfer bed 110.

The opposite surface 142 of the heat blocking element 140 faces the wall 122 of the first plenum's housing 121. Due to the wedge-shape of the heat blocking element 140, a distance between the surface 141 and the other surface 142 of the heat blocking element increases along the first spatial direction $\overrightarrow{x_1}$, and a distance between the surface 142 of the heat blocking element 140 and the wall 122 of the first plenum's housing 121 decreases along the first spatial direction $\overrightarrow{x_1}$.

As the distance between the surface 142 of the heat blocking element 140 and the wall 122 of the first plenum's housing 121 decreases along the first spatial direction $\overrightarrow{x_1}$, the volume of the first plenum 120 for the fluid 120 decrease along the first spatial direction $\overrightarrow{x_1}$. The decrease in volume along the first spatial direction $\overrightarrow{x_1}$ allows to compensate for the decrease in speed of the fluid 101 along the first spatial direction $\overrightarrow{x_1}$. By decreasing the volume of the first plenum 120 for the fluid 120 along the first spatial direction $\overrightarrow{x_1}$, the variation of the static pressure at the first opening 111 may be adjusted along the first spatial direction $\overrightarrow{x_1}$ in order to support the generation of the above described flow distribution of the fluid 101 in the heat-transfer bed 110.

The other heat-blocking element 150 may be shaped analogously as illustrated in FIG. 11. That is, the surface 151 of the heat blocking element 150 extends substantially parallel to the second opening 112 such that the gap 170 formed between the boundary 115 of the second opening 112 and the surface 151 of the heat blocking element 150 acts as a nozzle for the fluid 101. The opposite surface 152 of the heat blocking element 150 faces the wall 132 of the second plenum's housing 131. Due to the wedge-shape of the heat blocking element 150, a distance between the surface 151 and the other surface 152 of the heat blocking element 150 increases along the first spatial direction $\overrightarrow{x_1}$, and a distance between the surface 152 of the heat blocking element 150 and the wall 122 of the second plenum's housing 131 decreases along the first spatial direction $\vec{x}_1$.

In the example of FIG. 11, the heat blocking elements 140 and 150 exhibit a wedge shape. However, it is to be noted that the present disclosure is not limited thereto. In general any shape causing that the distance between the surface 141 and the other surface 142 of the heat blocking element 140 increases along the first spatial direction $\vec{x}_1$, and that the distance between the surface 142 of the heat blocking element 140 and the wall 122 of the first plenum's housing 121 decreases along the first spatial direction $\vec{x}_1$ may be used for the heat blocking element 140. The same holds true in analogous manner for the heat blocking element 150. For example, instead of a linear increase of the distance between the surface 141 and the other surface 142 of the heat blocking element 140 as illustrated in FIG. 11, a non-linear increase of the distance between the surface 141 and the other surface 142 of the heat blocking element 140 may be used.

Figure 12:
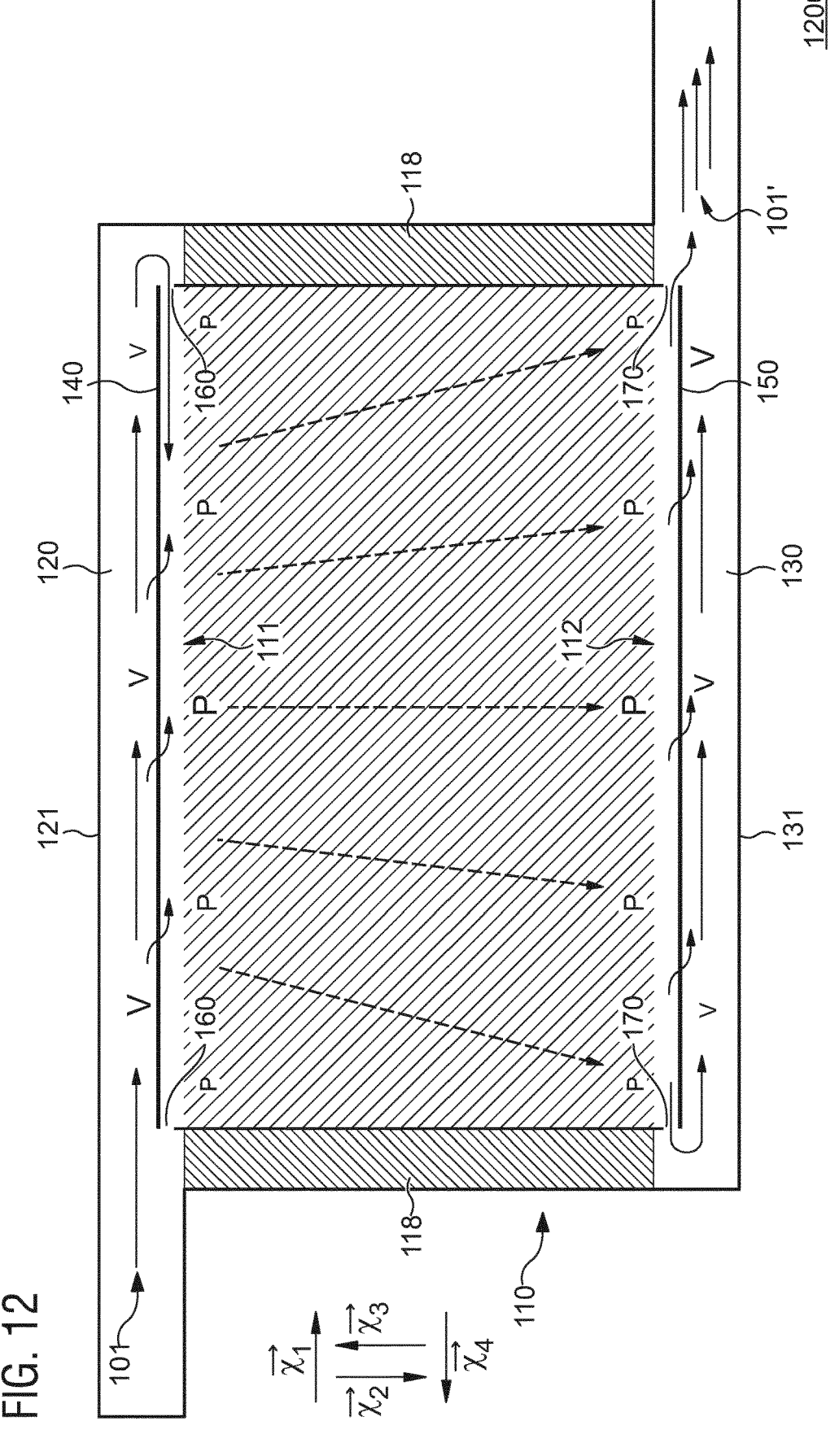
FIG. 12 illustrates a sectional view of a ninth example of a fluid reactor device.

In the above examples, the first plenum 120 and the second plenum 130 extend lengthwise along the first spatial direction $\vec{x}_1$ such that the fluid 101 travels along the along the first spatial direction $\vec{x}_1$ while the respective one of the first plenum 120 and the second plenum 130 is configured to supply the fluid 101 to the heat-transfer bed 110. However, the present disclosure is not limited thereto. According to examples of the present disclosure, the first plenum 120 and the second plenum 130 may extend lengthwise along different spatial directions. In particular, the first plenum 120 and the second plenum 130 may extend lengthwise along anti-parallel spatial directions. This is exemplarily illustrated in FIG. 12. FIG. 12 illustrates another exemplary fluid reactor device 1200 during a time period in which the first plenum 120 is configured to supply the fluid 101 to the heat-transfer bed 110 and the second plenum 140 is configured to drain the reacted fluid 101' from the heat-transfer bed 110.

The example of FIG. 12 is based on the example described above with respect to FIG. 1b and FIG. 2, contrary to the above example, the second plenum 130 extends along a fourth spatial direction $\vec{x}_4$, which is anti-parallel to the first spatial direction $\vec{x}_1$. Accordingly, unlike in the above examples, the reacted fluid 101' does not travel through the second plenum 130 along the fourth spatial direction $\vec{x}_4$ during a time period in which the second plenum 130 is configured to drain the reacted fluid 101' from the heat-transfer bed 110. Instead, the reacted fluid 101' travels through the second plenum 130 along the first spatial direction $\vec{x}_1$. Analogously, during a time period in which the second plenum 130 is configured to supply the fluid 101 to the heat-transfer bed 110 and the first plenum 120 is configured to drain the reacted fluid 101' from the heat-transfer bed 110, the fluid 101 does not travel through the second plenum 120 along the first spatial direction $\vec{x}_1$ but along the anti-parallel fourth spatial direction $\vec{x}_4$.

It is to be noted that according to examples of the present disclosure, the first plenum 120 and the second plenum 130 may also in the above described examples extend lengthwise along different spatial directions. In particular, the first plenum 120 and the second plenum 130 may also in the above described examples extend lengthwise along anti-parallel spatial directions similar to the example of FIG. 12. The positioning and/or orientation of the heat blocking element 150 in the second plenum 130 may be adjusted/changed accordingly (e.g. the positioning and/or orientation of the heat blocking element 150 may be with respect to the fourth spatial direction $\vec{x}_4$ instead of the first spatial direction $\vec{x}_1$ as described above).

Further, it is to be noted that although not explicitly described, the heat blocking element 140 may also in the examples of FIGS. 6 to 12 optionally comprise a plurality of recesses for passthrough of the fluid 101 and/or one or more surface structure for controlling a flow direction and/or flow characteristics of the fluid 101 locally—analogously to what is described with respect to the example of FIG. 1b and FIG. 2. The same holds true for the heat blocking element 150.

The examples described with respect to FIGS. 7 to 10 may each comprise at least one actuator coupled to the heat blocking element for moving one or more movable object or exerting a bending force on the respective heat blocking element 140 or 150. However, the present disclosure is not limited thereto. In general, in any of the above examples, the respective fluid reactor device may comprise at least one actuator coupled to the heat blocking element 140 and configured to adjust a positioning and/or orientation of the heat blocking element 140's surface 141 with respect to the first opening 111. For example, distance of the heat blocking element 140's surface 141 with respect to the first opening 111 may be adjusted to tune the nozzle-effect of the gap 160. Alternatively or additionally, a tilt angle of the heat blocking element 140's surface 141 with respect to the first opening 111 may be adjusted.

For example, the tilt angle of the heat blocking element 140's surface 141 with respect to the first opening 111 may be changed such that the orientation of the heat blocking element 140's surface 141 illustrated in FIG. 1b is changed to the orientation of the heat blocking element 140's surface 141 illustrated in FIG. 6.

The same holds true in analogous manner for the heat blocking element 150. That is, in any of the above examples, the respective fluid reactor device may comprise at least one actuator coupled to the heat blocking element 150 and configured to adjust a positioning and/or orientation of the heat blocking element 150's surface 151 with respect to the second opening 112.

Analogously to what is described above with respect to FIG. 9, the respective at least one actuator for adjusting the positioning and/or orientation of the respective one of the heat blocking element 140 and the heat blocking element 150 may be configured to adjust the respective positioning and/or orientation based on a temperature and/or a pressure and/or a differential pressure in the respective one of the first plenum 120 and the second plenum 130 as these quantities affect the variation of the static pressure at the respective one of the first opening 111 and the second opening 112. Alternatively or additionally, the respective at least one actuator for adjusting the positioning and/or orientation of the respective one of the heat blocking element 140 and the heat blocking element 150 may be configured to adjust the respective positioning and/or orientation time based and/or event based. For example, the respective at least one actuator may change the respective positioning and/or orientation of the heat blocking element 140 and the heat blocking element 150 during a time period directly before or after changing the overall fluid direction inside the first plenum 120 and the second plenum 130, or in case of exceptional events such as concentration peaks or downs in the fluid (e.g. a gas stream) entering the fluid reactor device. The respective at least one actuator may comprise or be coupled to one or more control circuitry for controlling the operation of the respective at least one actuator based on the temperature and/or the pressure and/or the differential pressure in the respective plenum and/or time based and/or event based—analogously to what is described above with respect to FIG. 9.

Figure 13:
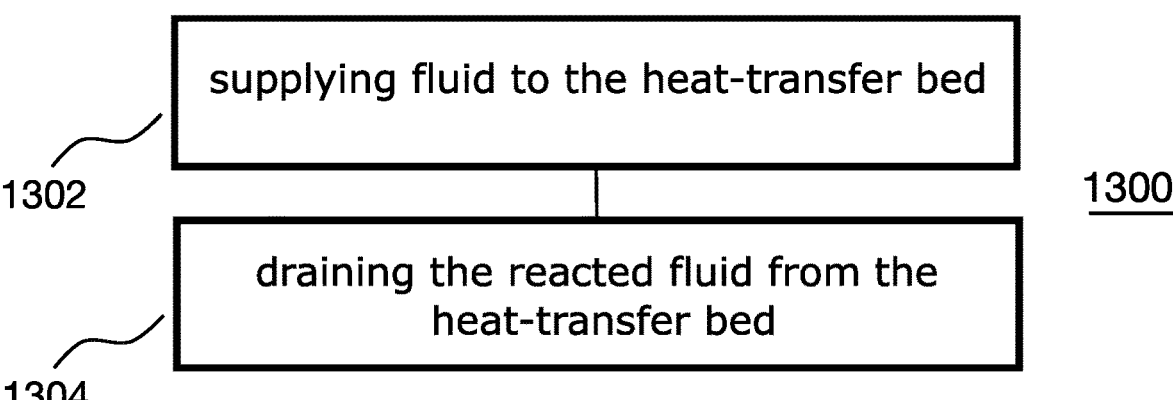
FIG. 13 illustrates a flowchart of an example of a method for operating a fluid reactor device as described herein.

For further illustrating the proposed architecture for fluid reaction processing, FIG. 13 illustrates a flowchart of a method 1300 for operating a fluid reactor device according to the present disclosure. The method 1300 comprises supplying 1302 fluid to the heat-transfer bed such that the fluid heats up and reacts while flowing through the heat storage material.

Similar to what is described above, the method 1300 may enable improved reaction processing of the fluid compared to conventional approaches. In particular, the heat blocking element in the first plenum may allow to reduce heat loses at the first opening of the heat-transfer bed. Furthermore, the heat blocking element in the first plenum may allow for an improved flow distribution of the fluid over the heat-transfer bed such that a more even temperature distribution in the heat-transfer bed may be achieved.

More details and aspects of the method 1300 are explained in connection with the proposed technique or one or more example described above (e.g. FIGS. 1a to 3 and 6 to 12). The method 1300 may comprise one or more additional optional feature corresponding to one or more aspect of the proposed technique or one or more example described above. For example, the method may further comprise draining 1304 the reacted fluid from the heat-transfer bed. In some examples, supplying 1302 the fluid to the heat-transfer bed may, e.g., comprise supplying the fluid to the heat-transfer bed alternatingly through the first plenum and the second plenum such that the fluid heats up and reacts while flowing through the heat storage material. In this case, draining 1304 the reacted fluid from the heat-transfer bed may comprise, during a time period in which one of the first plenum and the second plenum supplies the fluid to the heat-transfer bed, draining the reacted fluid from the heat-transfer bed through the other one of the first plenum and the second plenum. The periodic reversion of the flow direction of the fluid through the heat storage material may allow to maintain a high heat exchange efficiency of the heat storage material and allow to recover substantially all the heat needed for sustaining a needed reaction temperature in the heat-transfer bed. The aspects and features described in relation to a particular one of the previous examples may also be combined with one or more of the further examples to replace an identical or similar feature of that further example or to additionally introduce the features into the further example.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A fluid reactor device, in particular a fluid purification device, comprising:
   a heat-transfer bed comprising heat storage material, wherein the heat storage material is configured to heat fluid flowing through the heat storage material such that the fluid heats up and reacts while flowing through the heat storage material;
   a first plenum fluidly coupled to a first opening of the heat-transfer bed;
   a second plenum fluidly coupled to a second opening of the heat-transfer bed; and
   a heat blocking element arranged in the first plenum,
   wherein the first plenum and the second plenum are configured to alternatingly supply the fluid to the heat-transfer bed such that the fluid heats up and reacts while flowing through the heat storage material,
   wherein, during a time period in which one of the first plenum and the second plenum is supplying the fluid to the heat-transfer bed, the other one of the first plenum and the second plenum is draining the reacted fluid from the heat-transfer bed,
   wherein the heat blocking element is spaced apart from the heat-transfer bed and is spaced apart from a housing of the first plenum, and
   wherein the heat blocking element extends beyond the first opening and is configured to limit heat emission from the heat storage material into the first plenum.

2. The fluid reactor device of claim 1, further comprising another heat blocking element arranged in the second plenum, wherein the other heat blocking element is spaced apart from the heat-transfer bed and is spaced apart from a housing of the second plenum, and wherein the other heat blocking element extends beyond the second opening and is configured to limit heat emission from the heat storage material into the second plenum.

3. The fluid reactor device of claim 1, wherein a gap formed between a boundary of the first opening and a surface of the heat blocking element facing the first opening acts as a nozzle for the fluid when flowing from the first plenum to the heat-transfer bed.

4. The fluid reactor device of claim 3, wherein the surface of the heat blocking element extends substantially parallel to the first opening.

5. The fluid reactor device of claim 3, wherein the heat-transfer bed comprises one or more protrusion formed at the boundary of the first opening for defining the gap between the surface of the heat blocking element and the boundary of the first opening.

6. The fluid reactor device of claim 3, wherein the heat blocking element comprises at least one movable element (144, 145, 146, 148, 149) for adjusting the gap between the boundary of the first opening and at least part of the surface of the heat blocking element, and wherein the fluid reactor device further comprises at least one actuator configured to adjust, based on a temperature and/or a pressure and/or a differential pressure in the first plenum and/or time based and/or event based, a respective positioning and/or orientation of the at least one movable element (144, 145, 146, 148, 149) relative to the boundary of the first opening.

7. The fluid reactor device of claim 3, wherein the heat blocking element is bendable for adjusting the gap between the boundary of the first opening and at least part of the surface of the heat blocking element, and wherein the fluid reactor device further comprises at least one actuator configured to exert, based on a temperature and/or a pressure and/or a differential pressure in the first plenum and/or time based and/or event based, a force on the heat blocking element for bending the heat blocking element.

8. The fluid reactor device of claim 3, wherein the heat blocking element comprises a bimetal structure configured to bend the heat blocking element based on a temperature in the first plenum for adjusting the gap between the boundary of the first opening and at least part of the surface of the heat blocking element.

9. The fluid reactor device of claim 3, wherein the heat blocking element is substantially plate-shaped.

10. The fluid reactor device of claim 3, wherein the heat blocking element comprises another opposite surface facing a wall of the first plenum's housing, wherein the first opening and the wall of the first plenum's housing are arranged on opposite sides of the heat blocking element, wherein the first plenum extends lengthwise along a first spatial direction such that the fluid travels through the first plenum along the first spatial direction during a time period in which the first plenum is configured to supply the fluid to the heat-transfer bed, wherein a distance between the surface and the other surface of the heat blocking element increases along the first spatial direction, and wherein a distance between the other surface of the heat blocking element and the wall of the first plenum's housing decreases along the first spatial direction.

11. The fluid reactor device of claim 3, further comprising at least one actuator coupled to the heat blocking element, wherein the at least one actuator is configured to adjust, based on a temperature and/or a pressure and/or a differential pressure in the first plenum and/or time based and/or event based, a positioning and/or orientation of the heat blocking element's surface with respect to the first opening.

12. The fluid reactor device of claim 1, wherein a surface of the heat blocking element facing the first opening is tilted with respect to the first opening, wherein the first plenum extends lengthwise along a first spatial direction such that the fluid travels through the first plenum along the first spatial direction during a time period in which the first plenum is configured to supply the fluid to the heat-transfer bed, wherein a distance between the surface of the heat blocking element and the first opening increases along the first spatial direction, wherein a distance between another opposite surface of the heat blocking element and a wall of the first plenum's housing decreases along the first spatial direction, and wherein the first opening and the wall of the first plenum's housing are arranged on opposite sides of the heat blocking element.

13. The fluid reactor device of claim 1, wherein a plurality of recesses for passthrough of the fluid are formed in the heat blocking element, and wherein the plurality of recesses extend from a surface of the heat blocking element facing the first opening to another opposite surface of the heat blocking element.

14. The fluid reactor device of claim 13, wherein the first plenum extends lengthwise along a first spatial direction such that the fluid travels through the first plenum along the first spatial direction during a time period in which the first plenum is configured to supply the fluid to the heat-transfer bed, and wherein a respective size of the plurality of recesses for passthrough of the fluid and/or a number of recesses for passthrough per unit area increases along the first spatial direction.

15. The fluid reactor device of, claim 1 wherein the heat blocking element comprises one or more surface structure for controlling a flow direction and/or flow characteristics of the fluid locally.

16. The fluid reactor device of claim 1, further comprising an electrical heater configured to heat the heat storage material to a predefined temperature.

17. The fluid reactor device of claim 1, wherein catalyst material for lowering a reaction temperature of the fluid is arranged within the heat-transfer bed.

18. The fluid reactor device of claim 1, wherein the heat-transfer bed comprises a thermally insulating wall surrounding the heat storage material and extending between the first plenum and the second plenum, and wherein the first opening and the second opening are formed in the thermally insulating wall.

19. The fluid reactor device of claim 1, wherein the housing of the first plenum is at least partly formed of and/or is at least partly covered by a heat-insulating material.

20. A method for operating a fluid reactor device according to claim 1, the method comprising:
supplying fluid to the heat-transfer bed such that the fluid heats up and reacts while flowing through the heat storage material.

21. The method of claim 20, wherein supplying the fluid to the heat-transfer bed comprises supplying the fluid to the heat-transfer bed alternatingly through the first plenum and the second plenum such that the fluid heats up and reacts while flowing through the heat storage material, and
wherein the method further comprises:
during a time period in which one of the first plenum and the second plenum supplies the fluid to the heat-transfer bed, draining the reacted fluid from the heat-transfer bed through the other one of the first plenum and the second plenum.

* * * * *